(12) United States Patent
Malone et al.

(10) Patent No.: US 7,035,352 B1
(45) Date of Patent: Apr. 25, 2006

(54) APPARATUS AND METHOD FOR SIGNAL ACQUISITION IN A FSK DEMODULATOR WITH INTEGRATED TIME AND FREQUENCY TRACKING

(75) Inventors: Lawrence J. Malone, Carlsbad, CA (US); Aaron D. Lamb, San Diego, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 788 days.

(21) Appl. No.: 09/999,633

(22) Filed: Oct. 24, 2001

Related U.S. Application Data

(60) Provisional application No. 60/267,157, filed on Feb. 8, 2001.

(51) Int. Cl.
*H04L 27/14* (2006.01)
(52) U.S. Cl. ...................... 375/334; 375/316
(58) Field of Classification Search ............... 375/316, 375/334, 335, 344, 354, 272, 275, 276, 362–366, 375/343, 711; 329/300
See application file for complete search history.

(56) References Cited

U.S. PATENT DOCUMENTS 4,694,467 A * 9/1987 Mui ........................... 375/144
6,058,150 A * 5/2000 Ghosh ........................ 375/365

* cited by examiner

*Primary Examiner*—Robert Pascal
*Assistant Examiner*—Krista M. Flanagan

(57) ABSTRACT

A signal detection circuit for receiving a digital baseband signal comprising an amplitude modulated symbol stream of Logic 0 symbols and Logic 1 symbols, each of the Logic 0 and Logic 1 symbols comprising S sequential samples, wherein the amplitude modulated symbol stream contains a preamble of N known symbols preceding a plurality of user data symbols. The signal detection circuit comprises: A) a signal mean determination circuit that receives G samples from the digital baseband signal and determines an amplitude mean value associated with the amplitude modulated symbol stream; and B) a correlation circuit that detects the preamble.

20 Claims, 13 Drawing Sheets

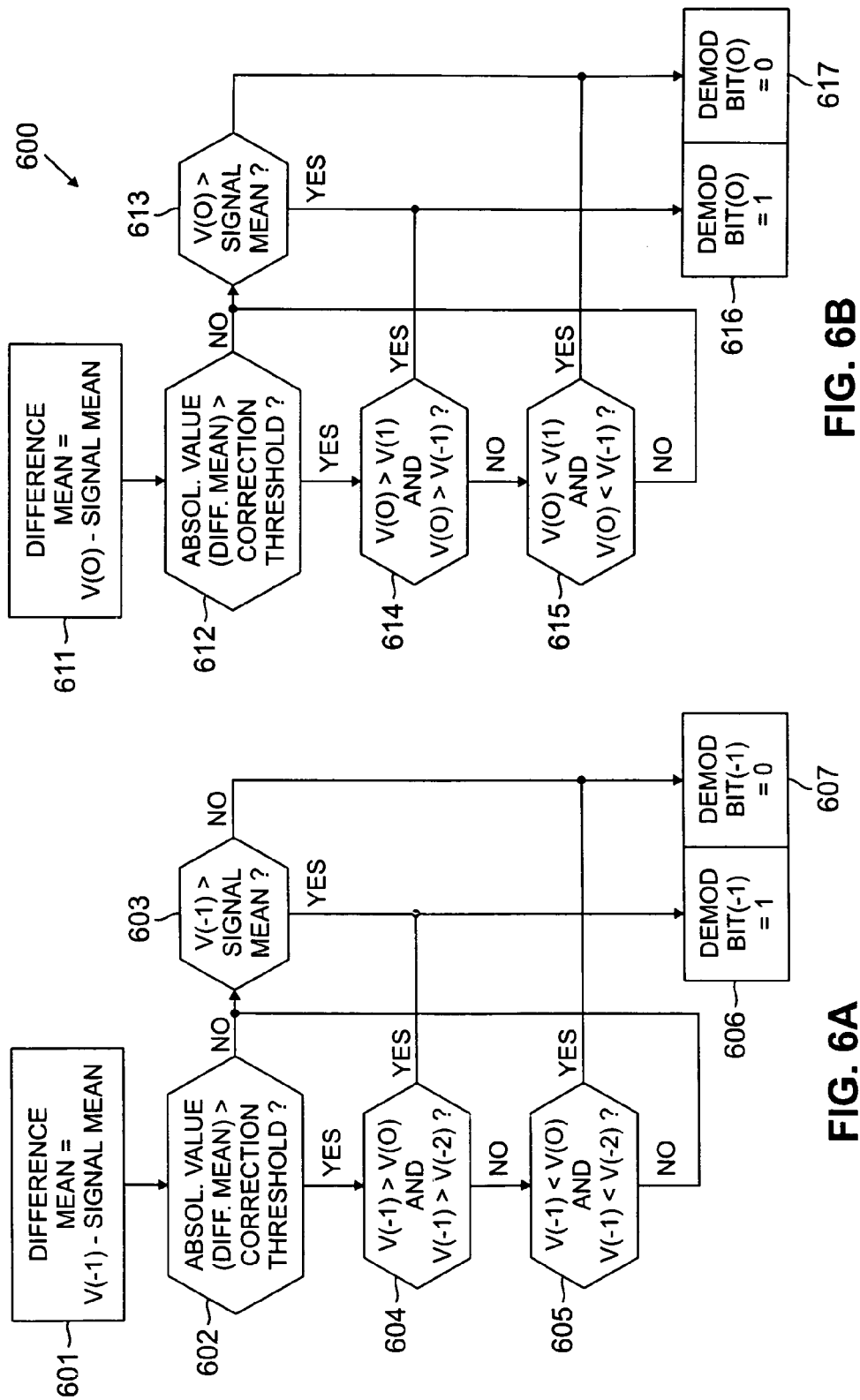

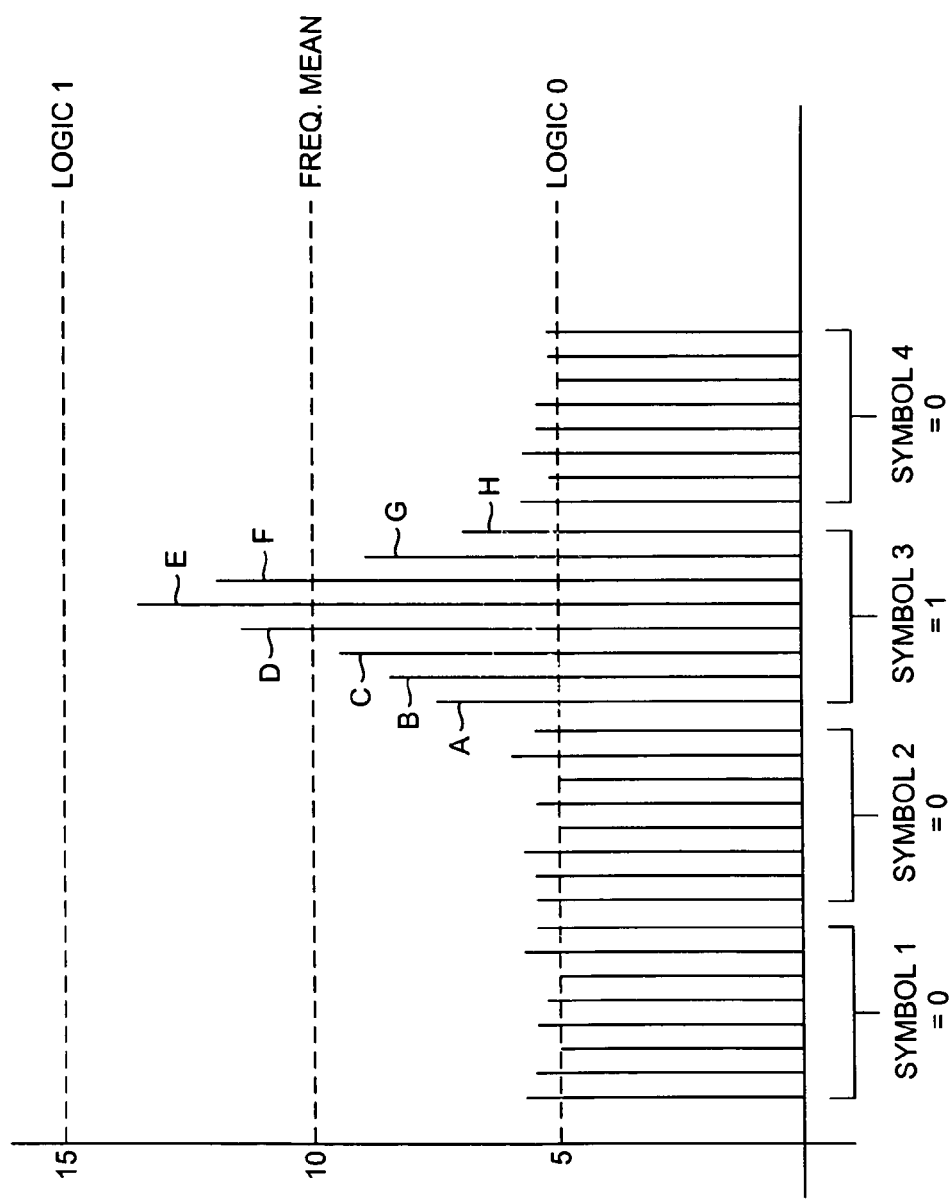

APPARATUS AND METHOD FOR SIGNAL ACQUISITION IN A FSK DEMODULATOR WITH INTEGRATED TIME AND FREQUENCY TRACKING

CROSS-REFERENCE TO RELATED APPLICATION

This application claims priority under 35 U.S.C. § 119(e)(1) to U.S. Provisional Patent Application No. 60/267,157 filed Feb. 8, 2001. This document and the invention disclosed herein, is incorporated by reference for all purposes as if fully set forth herein.

The present invention is related to the invention disclosed in U.S. patent application Ser. No. 09/938,018, filed on Aug. 23, 2001, entitled "Apparatus and Method for FSK Demodulation with Integrated Time and Frequency Tracking." application Ser. No. 09/938,018 is commonly assigned to the assignee of the present invention. The disclosure of the related patent application is hereby incorporated by reference for all purposes as if fully set forth herein.

TECHNICAL FIELD OF THE INVENTION

The present invention is directed, in general, to radio frequency (RF) receivers and, more specifically, to a frequency-shift keyed (FSK) demodulator that tracks and corrects frequency drift and time drift.

BACKGROUND OF THE INVENTION

The frequency spectrum of a digital radio system is broken into channels that are small sub-spectrums. A first transmitter and receiver pair establishes a communication link over a first predetermined channel while other transmitter and receiver pairs use other predetermined channels. The transmitter transmits to the receiver over the channel using a predetermined data rate and modulation scheme (e.g., BPSK, QPSK, BFSK, QFSK).

Typically, a data transmission consists of three parts. The first part is an unmodulated carrier signal. The second part is a preamble of known information that is relatively easy for the receiver to detect and to synchronize with. The preamble may be, for example, a period of carrier signal modulated by a known training sequence (e.g., square wave) using a simple modulation scheme (i.e., BFSK). The third part of the data transmission is the modulated waveform that contains the unknown information data bits that are being transmitted.

The data rate of the transmission is usually measured in bits per second (bps), including kilobits per second (Kbps) and megabits per second (Mbps). The number of bits per second is related to the type of signaling (also known as encoding and modulation) that is used to convey the information and the number of times per second that the transmitted signal changes its value. For example, in a frequency-shift-keyed (FSK) digital signal radio system, data is encoded by generating frequency deviations away from the carrier frequency. Decoding the transmitted information entails measuring the frequency deviations away from the carrier frequency and inferring the transmitted information.

However, if the transmitted carrier frequency is at a frequency other than the nominal frequency the receiver expects, the measurement of frequency deviation becomes inaccurate. Thus, the performance and sensitivity of the receiver are degraded. This is a known problem in FSK digital radio systems. The above-described problem is depicted in greater detail in FIGS. 1A through 2B.

FIG. 1A illustrates a frequency-shift keyed (FSK) carrier signal that is properly aligned to a receiver reference carrier signal. The transmitted carrier frequency is shown as a solid line and the receiver carrier frequency is shown as a dotted line. When no data bits are being transmitted, the transmitter carrier signal is equal to some center frequency value, such as 600 MHz. The receiver carrier reference signal is aligned with the center frequency value. For the sake of clarity, the dotted line representing the receiver carrier frequency is slightly offset in FIG. 1 from the solid line representing the transmitted carrier frequency so that the two lines do not coincide.

When data bits are transmitted, the frequency of the transmitted carrier signal is varied above and below the nominal or center frequency. These frequency variations are represented by the up and down arrows in FIG. 1A. For example, a Logic 1 may be transmitted by changing the transmitter frequency to 100 KHz above the center frequency and a Logic 0 may be transmitted by changing the transmitter frequency to 100 KHz below the center frequency. Thus, in the exemplary embodiment, a Logic 1 would be transmitted as 600.1 MHz and a Logic 0 would be transmitted as 599.9 MHz.

Within the receiver, the frequency variations in the transmitted carrier signal are translated into amplitude variations in the output voltage of a frequency discriminator or a similar circuit. FIG. 1B illustrates the amplitude modulated output of a frequency discriminator receiving an FSK carrier signal that is properly aligned with a reference voltage representing the receiver reference carrier signal. The amplitude modulated output voltage of the frequency discriminator is shown as a solid line and the reference voltage representing the receiver carrier frequency is shown as a dotted line. For the sake of clarity, the dotted line representing the amplitude modulated output voltage is slightly offset in FIG. 1B from the solid line representing the reference voltage so that the two lines do not coincide.

The amplitude modulated output voltage of the frequency discriminator is compared to the reference voltage to determine the value of the transmitted data. When no data bits are being transmitted, the amplitude modulated output voltage is equal to the reference voltage. When a Logic 1 data bit is transmitted and the transmitter frequency increases to, for example, 100 KHz above the center frequency, the frequency discriminator increases the amplitude modulated output voltage above the reference voltage. When a Logic 0 data bit is transmitted and the transmitter frequency decreases to, for example, 100 KHz below the center frequency, the frequency discriminator decreases the amplitude modulated output voltage below the reference voltage. A voltage comparator circuit translates the voltage differences into Logic 1 values and Logic 0 values. In the example shown in FIGS. 1A and 1B, the data sequence 101100 has been transmitted.

FIG. 2A illustrates a frequency-shift keyed (FSK) carrier signal that is not properly aligned to the receiver reference carrier signal. The transmitted carrier frequency has drifted to a higher center frequency than in FIGS. 1A and 1B. The transmitted carrier frequency is shown as a solid line and the receiver carrier frequency is shown as a dotted line. The receiver carrier reference frequency is so far below the new transmitted carrier frequency that positive and negative frequency variations of the transmitted carrier signal above and below the new center frequency are both higher than the receiver carrier frequency. Thus, positive and negative frequency variations are both represented by up arrows in FIG. 2A.

FIG. 2B illustrates the amplitude modulated output of a frequency discriminator receiving an FSK carrier signal that is misaligned with a reference voltage representing the receiver reference carrier signal. The amplitude modulated output voltage of the frequency discriminator is shown as a solid line and the reference voltage representing the receiver carrier frequency is shown as a dotted line. As a result of the increase in the transmitted carrier frequency, the receiver reference voltage is so far below the amplitude modulated output voltage of the frequency discriminator that positive and negative amplitude variations in the amplitude modulated output voltage are both higher than the reference voltage. As a result, comparison of the amplitude modulated output voltage and the reference voltage translates the voltage differences into inaccurate Logic 1 and Logic 0 values. In the example shown in FIGS. 2A and 2B, the transmitted data sequence is inaccurately determined to be 111111.

A receiver most accurately decodes the message when the receiver evaluates (or estimates) a bit level at the center of the bit (symbol) interval. Further degradation of the receiver performance occurs if the receiver measurements are not actually aligned to the bit (or symbol) center. During acquisition, the receiver and transmitter are synchronized in time and frequency by the preamble. However, once the receiver starts decoding the information, the receiver and transmitter drift apart in both time and frequency.

One method to re-synchronize the transmitter and the receiver frequencies is to measure the frequency difference and correct for it in the receiver. To synchronize the timing between the transmitter and receiver, the receiver must look for a known information pattern in the signal and align the decision timing in the receiver to optimize the decoding of the known information pattern. Many methods have been proposed and implemented to accomplish this.

As noted above, a conventional transmission consists of three parts: 1) an unmodulated signal, 2) a known preamble, and 3) a message containing unknown information. Typically, during signal acquisition, the receiver uses the information in the unmodulated signal and in the known preamble to attain accurate synchronization. During the third part of the message, the receiver may use a sequence-estimator demodulator to improve demodulation of the unknown information. Using this information (a decision-directed approach), the receiver tracks the time and frequency differences between the receiver and transmitter and corrects for the differences.

Traditionally, early-late gate symbol synchronization has been used in many communication systems. The operation of an early-late gate is based on the fact that the matched filtered demodulation produces an auto-correlation function that is symmetric and peaks at the optimum sampling time. FIG. 3 illustrates the relationship between the demodulated output of a frequency discriminator receiving a FSK signal and the auto-correlation function that the receiver produces to perform alignment with the received FSK signal. The demodulated waveform is a sequence of square-wave pulses and the auto-correlation function is a sequence of sawtooth-like signal peaks. At sampling time T1, a positive-going peak in the auto-correlation function is correctly aligned with the center of a Logic 1 bit in the demodulated waveform. At sampling time T2, a negative-going peak in the auto-correlation function is correctly aligned with the center of a Logic 0 bit in the demodulated waveform. If the peaks in the auto-correlation function drift away from the center of the bit periods, the early-late gate detection circuitry of the receiver automatically adjusts timing and frequency of the receiver reference signals to track and correct for the drift.

However, conventional demodulators typically make hard decisions on information symbols based on a single threshold value. This results in sub-optimal performance in the decision-making block. In particular, conventional sequence-estimation demodulators often make mistakes on bit levels that are different than the preceding and trailing bit levels, such as a 101 sequence or a 010 sequence.

Therefore, there is a need in the art for improved frequency shift keyed (FSK) receivers that are capable of more accurately adjusting for frequency and timing drifts between the incoming transmitted carrier frequency and the receiver carrier reference signal. In particular, there is a need for FSK receivers that are capable of more accurately determining bit levels that are different than the preceding and trailing bit levels.

SUMMARY OF THE INVENTION

The limitations inherent in the prior art described above are overcome by the present invention which provides an improved signal detection circuit capable of receiving a digital baseband signal comprising an amplitude modulated symbol stream of Logic 0 symbols and Logic 1 symbols, each of the Logic 0 and Logic 1 symbols comprising S sequential samples, wherein the amplitude modulated symbol stream contains a preamble of N known symbols preceding a plurality of user data symbols. According to an advantageous embodiment of the present invention, the signal detection circuit comprises: A) a signal mean determination circuit operable to receive G samples from the digital baseband signal and to determine therefrom an amplitude mean value associated with the amplitude modulated symbol stream; and B) a correlation circuit operable to detect the preamble, the correlation circuit capable of: 1) receiving substantially simultaneously a first sequential sample of sequential samples associated with each of N consecutive symbols; and 2) generating a sum value equal to a total number of the N first sequential samples matching a corresponding one of the N known preamble symbols; wherein the correlation circuit is capable of repeating steps 1) and 2) for the S-1 remaining sequential samples associated with the each of N consecutive symbols to thereby generate S sum values, wherein the correlation circuit is further capable of determining a Kth sequential sample associated with a maximum one of the S sum values and generating a detection signal associated with the Kth sequential sample.

According to one embodiment of the present invention, the correlation circuit comprises a first FIFO assembly comprising serially-coupled N FIFO units, each of the N FIFO units capable of storing S sequential samples associated with one of the N consecutive symbols.

According to another embodiment of the present invention, the correlation circuit further comprises a first group of comparators operable to compare substantially simultaneously the N first sequential samples retrieved from the N FIFO units to the amplitude mean value and, in response to the comparison, to generate N decided values, each of the N decided values equal to a Logic 1 value if a corresponding first sequential sample is greater than the amplitude mean value and equal to a Logic 0 value if the corresponding first sequential sample is less than the amplitude mean value.

According to still another embodiment of the present invention, the correlation circuit further comprises a second group of comparators operable to compare substantially simultaneously each of the N decided values to the corresponding one of the known preamble symbols, and, in response to the comparison, to generate a match value equal to Logic 1 for each of the N decided values that equals the corresponding known preamble symbol and to generate a match value equal to Logic 0 for each of the N decided values that does not equal the corresponding known preamble symbol.

According to yet another embodiment of the present invention, the correlation circuit further comprises a summer operable to add the N match values to thereby generate the sum value.

According to a further embodiment of the present invention, the correlation circuit further comprises peak detection circuitry capable of determining if the sum value exceeds a predetermined threshold and generating the detection signal if the sum value exceeds the predetermined threshold.

According to a still further embodiment of the present invention, the signal mean determination circuit determines the amplitude mean value from G samples immediately preceding the N known preamble symbols.

According to a yet further embodiment of the present invention, the signal detection circuit is associated with a demodulation circuit capable of demodulating the plurality of user data symbols following the N known preamble symbols, wherein the signal detection circuit transmits the amplitude mean value to the demodulation circuit in response to generation of the detection signal.

In one embodiment of the present invention, the signal detection circuit, in response to generation of the detection signal, transmits to the demodulation circuit a time offset value associated with the Kth sequential sample.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which:

FIGS. 6A–6C depict a flow diagram illustrating the operation by which the exemplary demodulation and time tracking logic determines (i.e. decides) the value of demodulated data bits by comparing the demodulated data bits to a signal mean reference level and to a preceding data bit and a trailing data bit according to an exemplary embodiment of the present invention;

FIG. 10 illustrates in greater detail the 7-bit digital samples of four symbols according to an exemplary embodiment of the present invention.

DETAILED DESCRIPTION OF THE INVENTION

FIGS. 1 through 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged radio frequency (RF) receiver.

Figure 1A:
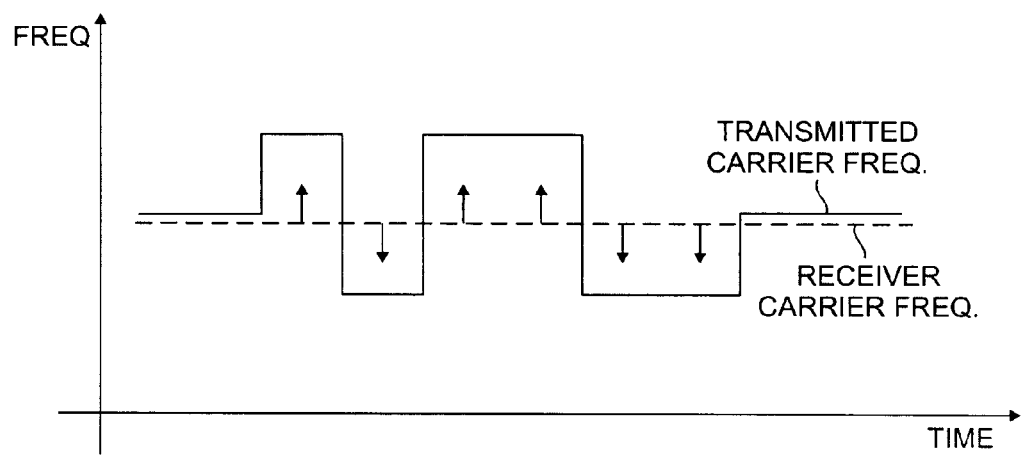
FIG. 1A illustrates a frequency-shift keyed (FSK) carrier signal that is properly aligned to a receiver reference carrier signal.
Figure 1B:
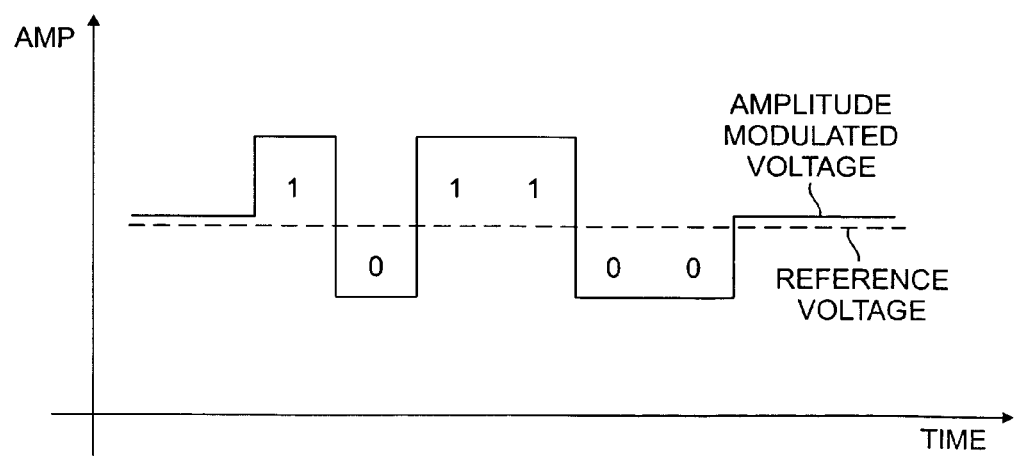
FIG. 1B illustrates the amplitude modulated output of a frequency discriminator receiving an FSK carrier signal that is properly aligned with a reference voltage representing the receiver reference carrier signal.
Figure 2A:
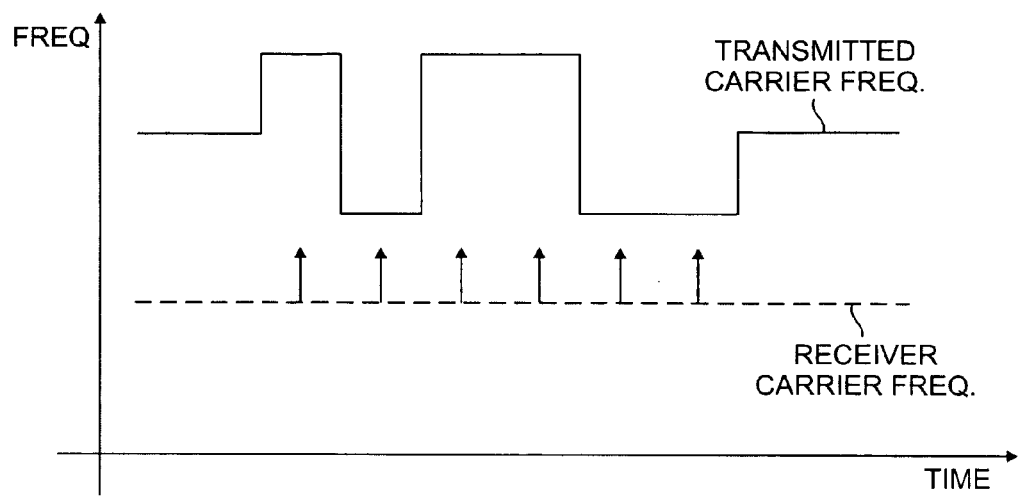
FIG. 2A illustrates a frequency-shift keyed (FSK) carrier signal that is not properly aligned to the receiver reference carrier signal.
Figure 2B:
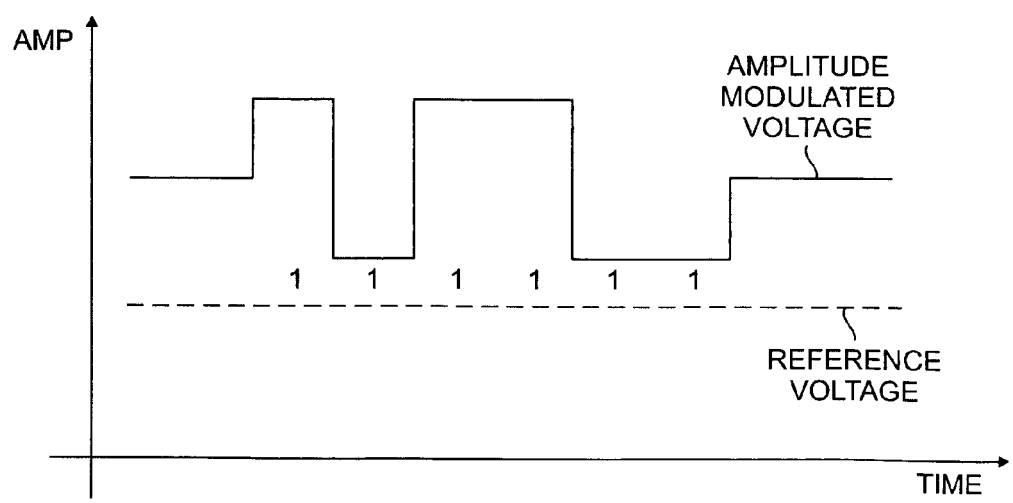
FIG. 2B illustrates the amplitude modulated output of a frequency discriminator receiving an FSK carrier signal that is misaligned with a reference voltage representing the receiver reference carrier signal.
Figure 3:
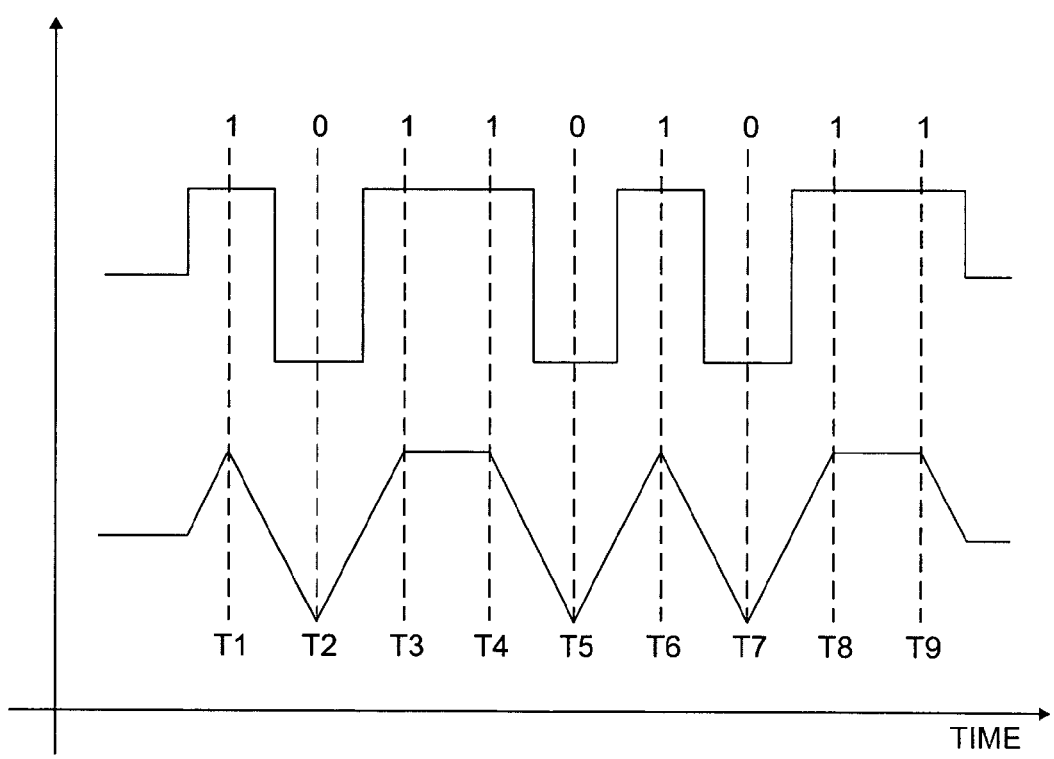
FIG. 3 illustrates the relationship between the demodulated output of a frequency discriminator receiving a FSK signal and the auto-correlation function that the receiver produces to perform alignment with the received FSK signal.
Figure 4:
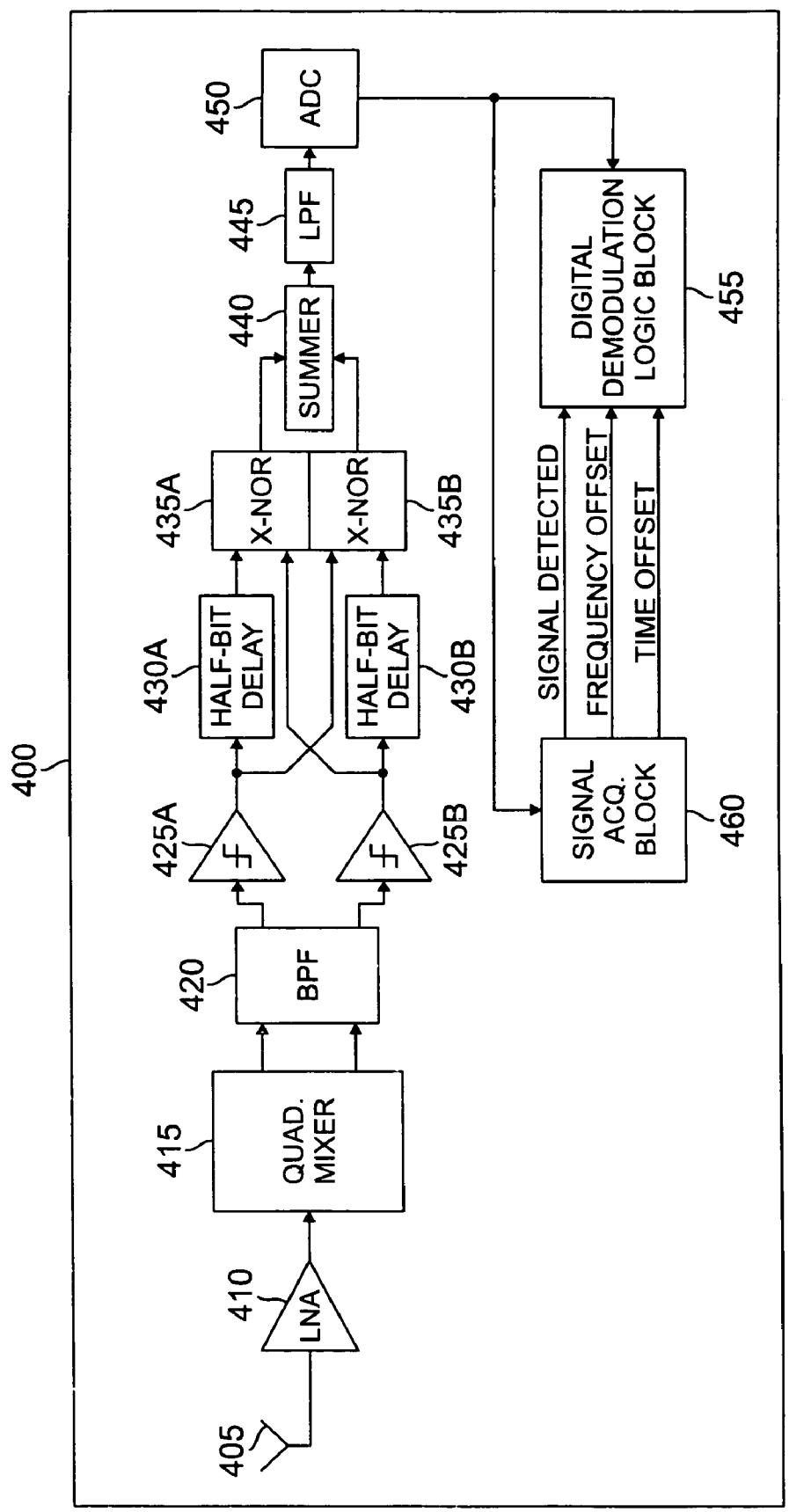
FIG. 4 is a block diagram of a frequency-shift-keyed (FSK) receiver 400 according to an exemplary embodiment of the present invention.

FIG. 4 is a block diagram of a frequency-shift-keyed (FSK) receiver 400 according to an exemplary embodiment of the present invention. FSK receiver 400 comprises antenna 405, low-noise amplifier (LNA) 410, quadrature mixer 415, bandpass filter (BPF) 420, saturation amplifiers 425A and 425B, half-bit delay elements 430A and 430B, exclusive-NOR (X-NOR) gates 435A and 435B, summer 440, low-pass filter (LPF) 445, and analog-to-digital converter (ADC) 450. FSK receiver 400 also comprises digital demodulation logic block 455 and signal acquisition block 460.

LNA 410 amplifies an incoming FSK signal received from antenna 405. The amplified FSK signal is quadrature down-mixed by quadrature mixer 415 to produce an in-phase (I) signal and a quadrature (Q) signal that are filtered by BPF 420 in order to isolate the frequencies of interest. According to an exemplary embodiment of the present invention, BPF 420 may have a center frequency at the data rate (i.e., 1 MHz) and a 3 dB bandwidth equivalent to the data rate (i.e., 500 KHz to 1.5 MHz).

The filtered outputs of BPF 420 are amplified and clipped by saturation amplifiers 425A and 425B, which have very high voltage gain. The frequency modulation is then converted to amplitude modulation by the frequency discriminator, which consists of half-bit delay elements 430A and 430B, X-NOR gates 435A and 435B, summer 440 and LPF 445. Low-pass filter 445 has a 3 dB cutoff at a value of 0.7 (data rate). The output waveform from the frequency discriminator is then digitized at eight (8) times the data rate by 5-bit ADC 450.

The 5-bit binary samples from ADC 450 are sent at 8 Mbps to digital demodulation logic block 455 and signal acquisition block 460. The 5-bit samples form an approximate digital representation of the auto-correlation function illustrated and described in FIG. 3. The 5-bit samples may have values ranging from +15 to −16, for example.

Figure 5:
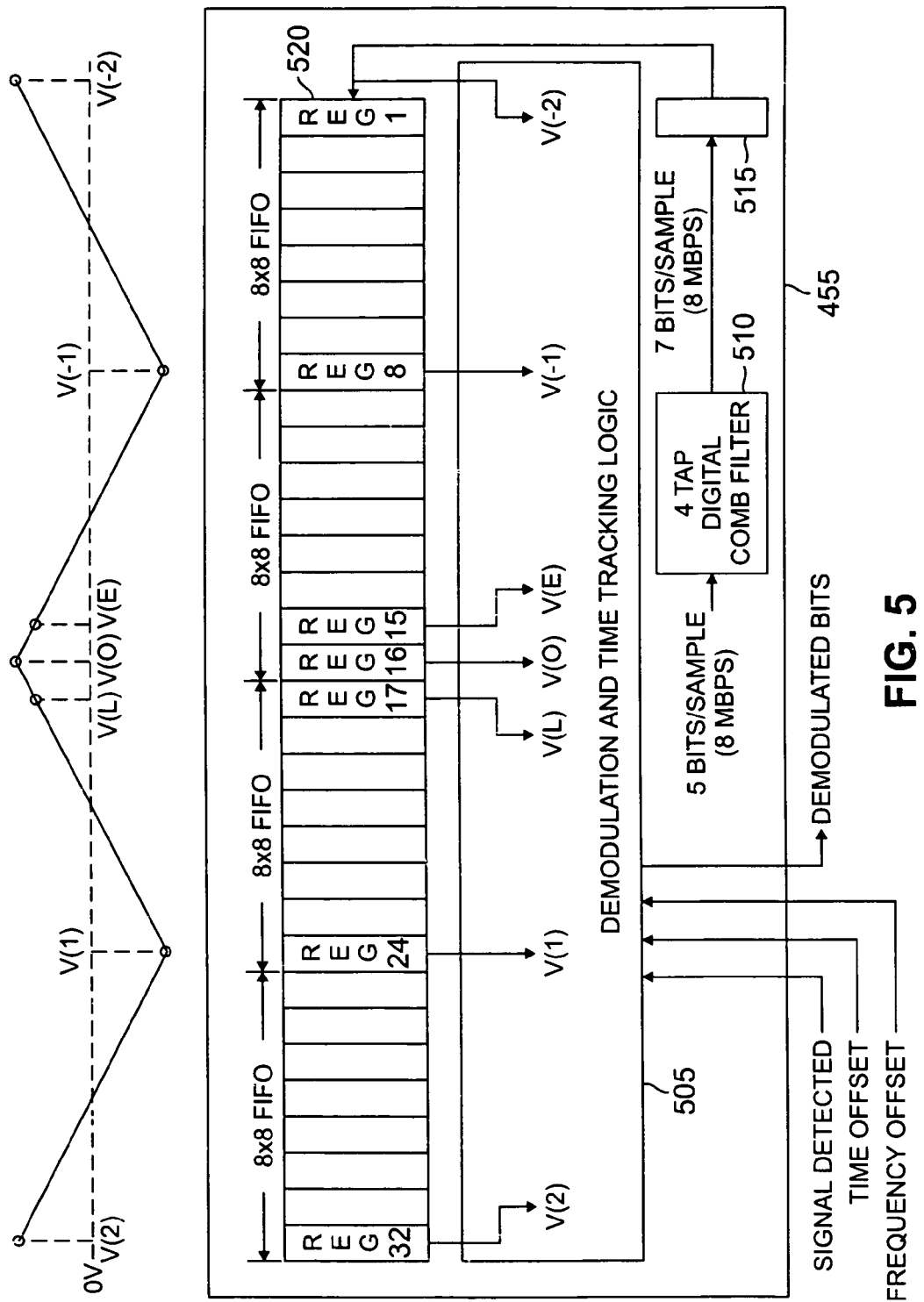
FIG. 5 illustrates the digital demodulation logic block in the exemplary frequency-shift-keyed (FSK) receiver in greater detail according to an exemplary embodiment of the present invention.

FIG. 5 illustrates digital demodulation logic block 455 in exemplary frequency-shift-keyed (FSK) receiver 400 in greater detail according to an exemplary embodiment of the present invention. Digital demodulation logic block 455 comprises demodulation and time tracking logic block 505, 4-tap digital comb filter 510, register 515, and first-in first-out (FIFO) unit 520. According to an exemplary embodiment of the present invention, FIFO unit 520 comprises thirty-two (32) 8-bit registers.

The key improvement provided by digital demodulation logic block 455 is that each bit (or symbol) is evaluated based on the values of the preceding and following bits. By examining multiple bits around the bit of interest (i.e., the bit being decided), the present invention provides more accurate demodulation. In particular, the present invention uses 101 sequences and 010 sequences to more accurately track time and frequency variations. Digital demodulation logic block 455 performs three functions:

1) sequence estimator (SE) demodulation;
2) frequency tracking; and
3) time tracking.

Comb filter 510 processes the 5-bit data samples from ADC 450 to remove quantization noise introduced by ADC 450 and to produce a better approximation to the auto-correlation function. Comb filter 510 increases the positive and negative peak sample values in the auto-correlation function relative to the samples having smaller magnitudes (i.e., near zero). The output of comb filter 510 are 7-bit values at an 8 MHz data rate.

The 7-bit samples are initially transferred into register 515 before being transferred into FIFO unit 520. Register 515 and FIFO unit 520 together form a 33 stage FIFO. Register 515 and each stage in FIFO unit 520 hold seven (7) bits. The outputs of certain registers are used by demodulation and time tracking logic 505 for time tracking, frequency tracking, and SE demodulation. An ideal auto-correlation function is shown in ideal alignment with the registers of FIFO unit 520 and register 515.

Demodulation and time tracking logic 505 receives the value V(−2) from the output of register 515 and the value V(−1) from the output of the eighth register (REG8) in FIFO unit 520. V(−2) represents a positive peak that is ideally aligned with the center of a Logic 1 bit and V(−1) is a negative peak that is aligned with the center of a Logic 0 bit. Demodulation and time tracking logic 505 also receives the value V(2) from the output of the thirty-second register (REG32) in FIFO unit 520 and the value V(1) from the output of the twenty-fourth register (REG24) in FIFO unit 520. V(2) represents a positive peak that is ideally aligned with the center of a Logic 1 bit and V(1) is a negative peak that is aligned with the center of a Logic 0 bit.

At the center of FIFO unit 520 are the fifteenth register (REG15), the sixteenth register (REG16), and the seventeenth register (REG17). Demodulation and time tracking logic 505 receives the value V(O) from the output of REG16 in FIFO unit 520, the value V(E) from the output of REG15, and the value V(L) from the output of REG17. V(O) represents a positive peak that is ideally aligned with the center of a Logic 1 bit.

A total of five logic bits are in FIFO unit 520 and register 515. Each logic bit is represented by eight samples in FIFO unit 520 and register 515. V(O) is the center sample of the current logic bit that is being decided by demodulation and time tracking logic 505. V(O) represents the Value(On-Time) sample, V(E) represents the Value(Early) sample, and V(L) represents the Value(Late) sample. V(2) is the center of the logic bit that preceded the current logic bit by two. V(1) is the center of the logic bit that immediately preceded the current logic bit. V(−2) is the center of the logic bit that trails the current logic bit by two. V(−1) is the center of the logic bit that immediately follows the current logic bit. Since V(O) is a positive peak (i.e., Logic 1) and V(1) and V(−1) are negative peaks (i.e., Logic 0), demodulation and time tracking logic 505 is evaluating a 010 sequence. The total sequence from V(2) to V(−2) is 10101.

As will be described below in greater detail, demodulation and time tracking logic 505 uses V(L), V(O) and V(E) to track time and frequency drift and to generate corrections to better synchronize demodulation in FSK receiver 400. When alignment is correct, V(O) has a greater magnitude than the two surrounding samples, V(E) and V(L). Thus, for a Logic 1, the value of V(O) is more positive than the V(E) and V(L) values and, for a Logic 0, the value of V(O) is more negative than the V(E) and V(L) values. If this is not the case, demodulation and time tracking logic 505 generates time and frequency correction signals that either advance or delay the demodulation of V(O) in order to properly synchronize FSK receiver 400.

Demodulation and time tracking logic 505 does a sliding window average (i.e., 4-tap comb filter) on the signal in effect producing a matched filter auto-correlation on the discriminated data. Demodulation and time tracking logic 505 receives a Signal Detected signal, an initial Time Offset signal, and an initial Frequency Offset signal from signal acquisition block 460, which identifies the center of bit-time. Thereafter, once every bit-time, demodulation and time tracking logic 505 makes a decision as to the value of the new symbol. In addition, once every bit-time (i.e., once every 8 samples), demodulation and time tracking logic 505 performs time and mean frequency tracking.

In general, due to noise, inter-symbol interference (ISI), and the filtering affects of the transmitter and receiver, decoding the Logic 1 in a 010 symbol sequence and the Logic 0 in a 101 symbol sequence are the most likely decisions to cause errors. To reduce complexity, the present invention focuses on increasing the probability of correctly decoding 010 and 101 symbol sequences. The present invention compensates for inter-symbol interference and system noise in the case of 010 and 101 symbol combinations. Demodulation and time tracking logic 505 makes a decision for each symbol (either a Logic 1 or a Logic 0) based upon the value of each symbol compared to the mean value of the signal, as well as the value of each symbol compared to the values of the preceding symbol and the trailing symbol. In other cases, such as 111 symbol patterns, the only criteria for decision is based on the bit value compared to the signal mean.

Keeping the transmitter and receiver synchronized in time improves demodulator performance. This operation of an early-late gate is based on the fact that the demodulated BFSK waveform is the basic pulse used in the transmission. Comb filter 510 produces an auto-correlation peak at the optimum sampling time for 010 and 101 bit pattern combinations. For 010 and 101 combinations, demodulation and time tracking logic 505 examines adjacent samples (i.e., V(L) and V(E)) and if either is larger than center value, V(O), the optimum sampling time is adjusted in that direction.

The mean value of the signal is the difference in transmitter carrier and receiver carrier frequencies and is used in demodulation. Any drift in the carrier frequency results in a shift of the mean value. The present invention accumulates symbol amplitudes for four 010 symbol patterns and four 101 symbol patterns. The result is filtered and added to the present mean value, creating a new mean that tracks the frequency offset. To track the mean, demodulation and time tracking logic 505 detects 010 and 101 sequences and finds the average value of the center bit of each combination and then averages those values together to find the new mean.

FIGS. 6–8 are flow diagrams illustrating the operation of selected functions in demodulation and time tracking logic 505 according to an advantageous embodiment of the present invention. Those skilled in the art will recognize that the functions performed by demodulation and time tracking logic 505 may be implemented by a wide variety of circuit architectures. These architectures are generally interchangeable and no particular circuit layout is preferred. In particular, demodulation and time tracking logic 505 may be implemented using one or more application specific integrated circuit (ASIC) chips, including an ASIC chip that may contain an embedded digital signal processor (DSP).

Figure 6C:
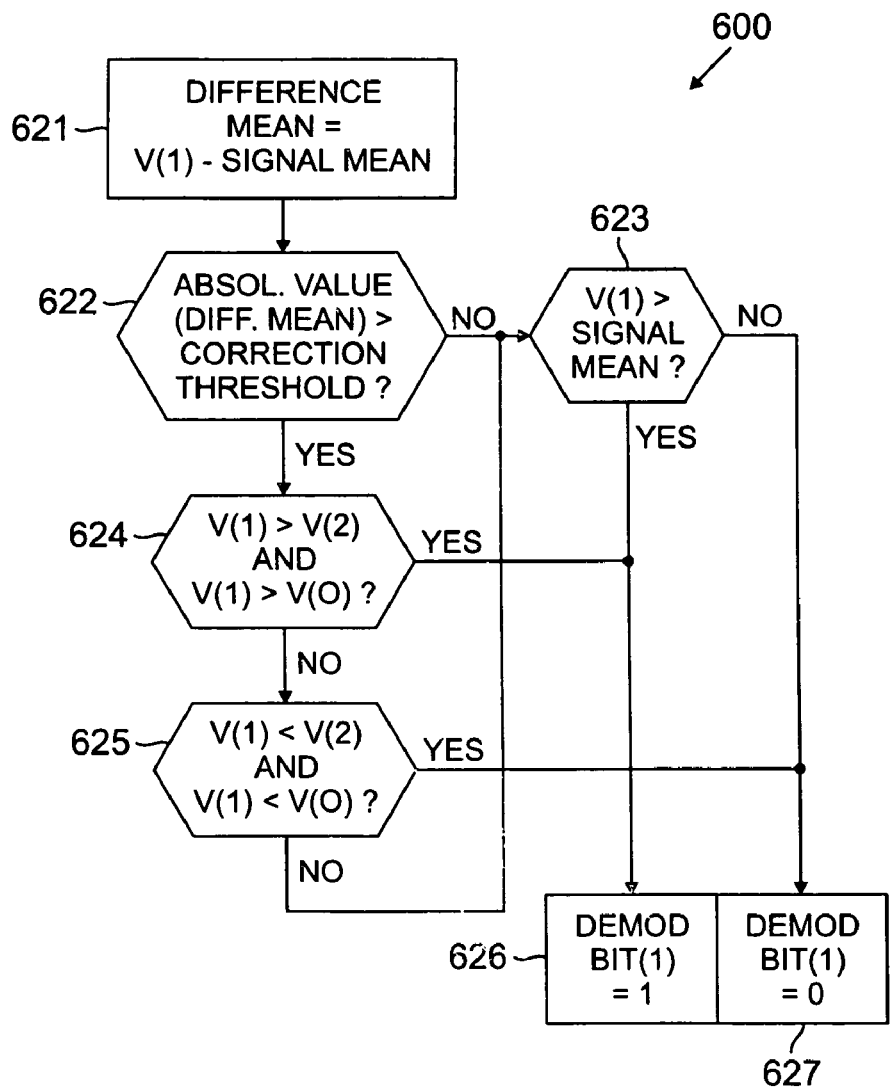

FIGS. 6A–6C depict flow diagram 600, which illustrates the operation by which demodulation and time tracking logic 505 determines (i.e., decides) the value of demodulated data bits by comparing the demodulated data bits to a signal mean reference level and to a preceding data bit and a trailing data bit. The algorithm executed by demodulation and time tracking logic 505 and illustrated by FIGS. 6A–6C begins every 1 bit-time and is initially synchronized to the estimate of the bit-time center given by signal acquisition block 460. If the symbol (bit) value is within a certain region around the mean value, demodulation and time tracking logic 505 exploits the information in the surrounding bits to determine its binary value.

In FIG. 6A, demodulation and time tracking logic 505 decides the logic level of the V(−1) value with respect to the signal mean and the V(O) value (i.e., the preceding bit) and the V(−2) value (i.e., the trailing bit). Initially, demodulation and time tracking logic 505 calculates a Difference Mean equal to the difference between the V(−1) value and the signal mean (process step 601). Next, demodulation and time tracking logic 505 determines whether the absolute value of the Difference Mean exceeds a Correction Threshold value (process step 602). In other words, demodulation and time tracking logic 505 determines if the V(−1) value is above or below the signal mean by more than the amount of the Correction Threshold value. By way of example, if the signal mean is 0 and the Correction Threshold value is 10, demodulation and time tracking logic 505 tests to determine whether the V(−1) value is above +10 or below −10.

If the absolute value of the Difference Mean does not exceed the Correction Threshold value, then demodulation and time tracking logic 505 determines if V(−1) is greater than the signal mean (process step 603). If YES, then demodulation and time tracking logic 505 determines (decides) that the V(−1) value is a Logic 1 (i.e., Demod Bit(−1)=1) (process step 606). If NO, then demodulation and time tracking logic 505 determines (decides) that the V(−1) value is a Logic 0 (i.e., Demod Bit(−1)=01) (process step 607).

If the absolute value of the Difference Mean does exceed the Correction Threshold value, then demodulation and time tracking logic 505 determines if V(−1) is greater than both the V(O) value and the V(−2) value (process step 604). If YES, then demodulation and time tracking logic 505 determines (decides) that the V(−1) value is a Logic 1 (i.e., Demod Bit(−1)=1) (process step 606). If NO, then demodulation and time tracking logic 505 determines if V(−1) is less than both the V(O) value and the V(−2) value (process step 605). If YES, then demodulation and time tracking logic 505 determines (decides) that the V(−1) value is a Logic 0 (i.e., Demod Bit(−1)=0) (process step 607). If NO, then demodulation and time tracking logic 505 determines if V(−1) is greater than the signal mean (process step 603). If YES, then demodulation and time tracking logic 505 determines (decides) that the V(−1) value is a Logic 1 (i.e., Demod Bit(−1)=1) (process step 606). If NO, then demodulation and time tracking logic 505 determines (decides) that the V(−1) value is a Logic 0 (i.e., Demod Bit(−1)=0) (process step 607).

In FIGS. 6B and 6C, the V(O) value and the V(−2) value are decided in a similar manner to the V(−1) value depicted in process steps 601–607. In FIG. 6B, demodulation and time tracking logic 505 decides the logic level of the V(O) value with respect to the signal mean and the V(1) value (i.e., the preceding bit) and the V(−1) value (i.e., the trailing bit) (see process steps 611–617). In FIG. 6C, demodulation and time tracking logic 505 decides the logic level of the V(1) value with respect to the signal mean and the V(2) value (i.e., the preceding bit) and the V(O) value (i.e., the trailing bit) (see process steps 621–627).

Figure 7A:
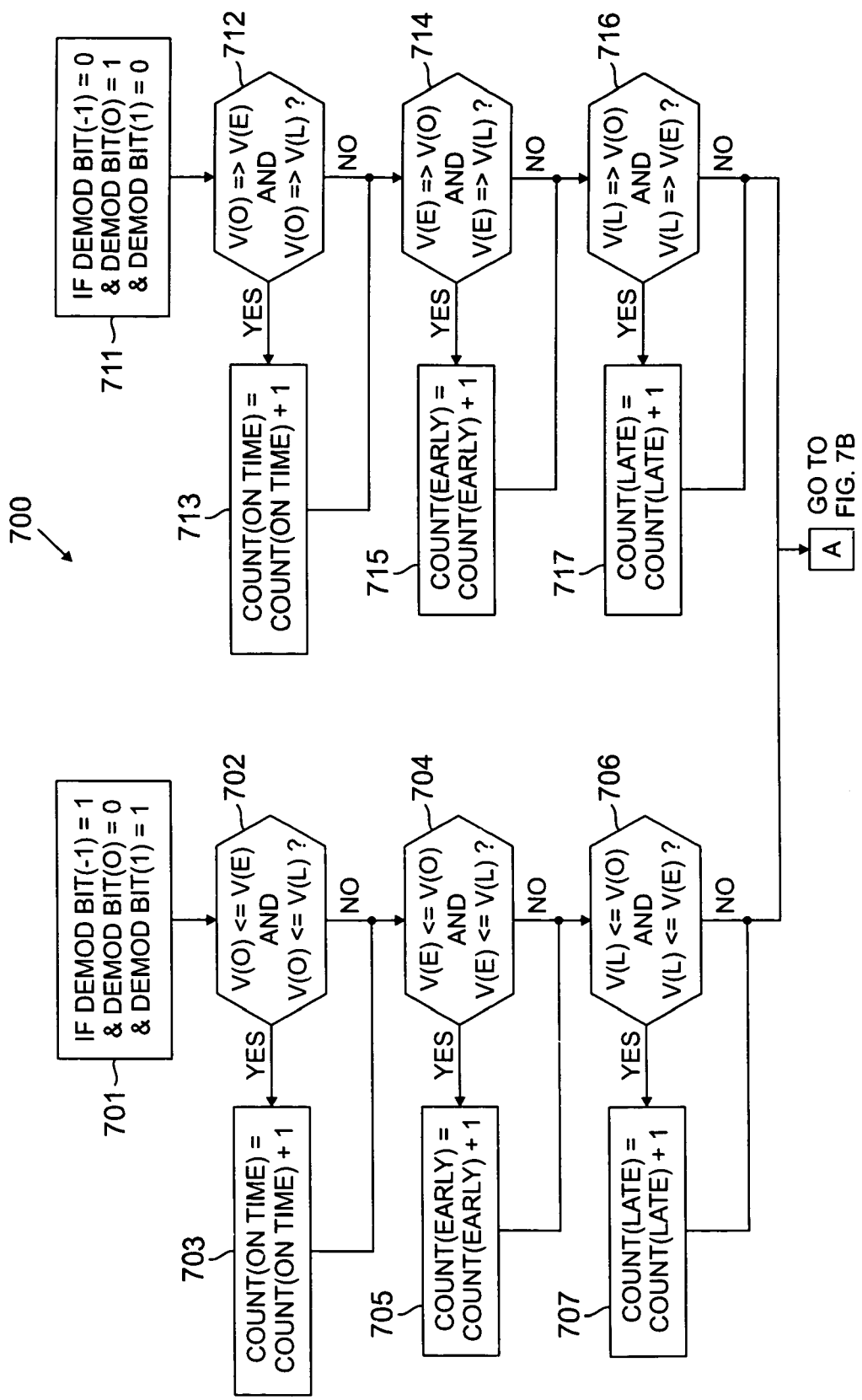
FIGS. 7A and 7B depict a flow diagram illustrating the time tracking operation performed by the demodulation and time tracking logic according to one embodiment of the present invention.
Figure 7B:
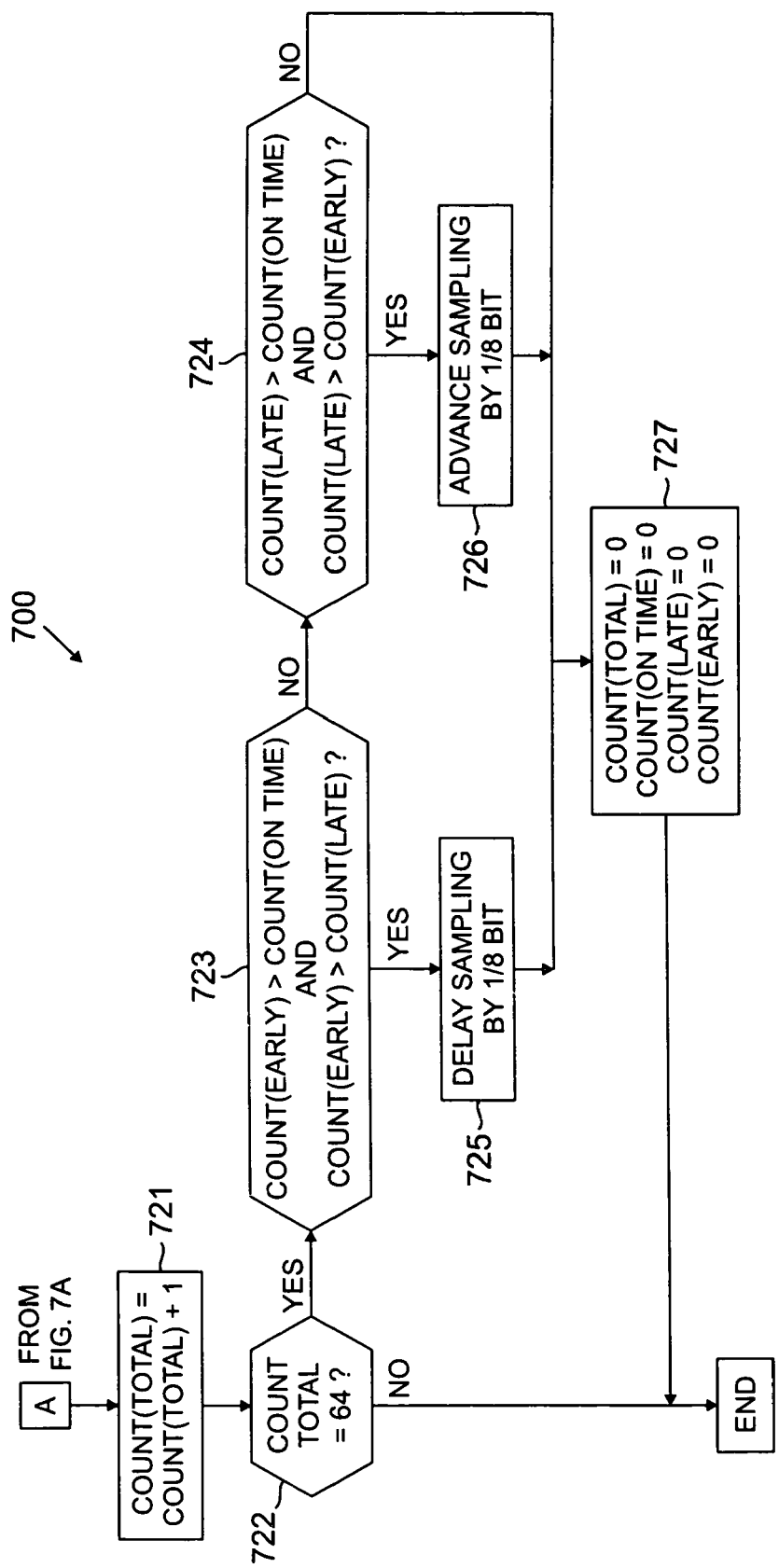

FIGS. 7A and 7B depict flow diagram 700, which illustrates the time tracking operation performed by demodulation and time tracking logic 505 according to an exemplary embodiment of the present invention. The algorithm executed by demodulation and time tracking logic 505 and illustrated in FIGS. 7A and 7B begins every 1 bit-time is initially synchronized to the estimate of the bit-time center given by signal acquisition block 460. The auto-correlation function has the property that it is symmetric and peaks at the optimum sampling time. That means 010 and 101 symbol patterns will have observable peaks which can be used to track timing differences between the transmitter and the receiver. Upon determining the center time is ⅛ of a bit time before/after the current time, the next demodulation instant is delay/accelerated ⅛ bit.

If demodulation and time tracking logic 505 determines that Demod Bit(1), Demod Bit(O), and Demod Bit(−1) comprise either a 101 sequence or a 010 sequence, demodulation and time tracking logic 505 compares the V(O) value to the V(E) value and the V(L) value to determine if the corresponding negative-going peak or positive-going peak in the auto-correlation function is properly aligned with REG16 in FIFO unit 520 (i.e., peak occurs at V(O)).

If a 101 sequence is detected (process step 701), demodulation and time tracking logic 505 determines if the V(O) value is less than or equal to the V(E) and V(L) values (process step 702). If YES, then the negative-going peak in the auto-correlation function is properly aligned with REG16 and the V(O) value and demodulation and time tracking logic 505 increments the COUNT(ON TIME) value in an internal counter (process step 703). If NO, then demodulation and time tracking logic 505 determines if the V(E) value is less than or equal to the V(O) and V(L) values (process step 704). If YES, then the V(E) value and REG 15 are closer to the negative-going peak, indicating that the peak occurs earlier than REG16 and the V(O) value. In response, demodulation and time tracking logic 505 increments the COUNT(EARLY) value in an internal counter (process step 705). If NO, then demodulation and time tracking logic 505 determines if the V(L) value is less than or equal to the V(O) and V(E) values (process step 706). If YES, then the V(L) value and REG 17 are closer to the negative-going peak, indicating that the peak occurs later than REG16 and the V(O) value. In response, demodulation and time tracking logic 505 increments the COUNT(LATE) value in an internal counter (process step 707).

If demodulation and time tracking logic 505 determines that the V(L) value is not less than or equal to the V(O) and V(E) values (process step 706), or after completion of process step 707, demodulation and time tracking logic 505 increments the COUNT(TOTAL) value in an internal counter (process step 721).

If a 010 sequence is detected (process step 711), demodulation and time tracking logic 505 determines if the V(O) value is greater than or equal to the V(E) and V(L) values (process step 712). If YES, then the positive-going peak in the correlation function is properly aligned with REG16 and the V(O) value and demodulation and time tracking logic 505 increments the COUNT(ON TIME) value in an internal counter (process step 713). If NO, then demodulation and time tracking logic 505 determines if the V(E) value is greater than or equal to the V(O) and V(L) values (process step 714). If YES, then the V(E) value and REG 15 are closer to the positive-going peak, indicating that the peak occurs earlier than REG16 and the V(O) value. In response, demodulation and time tracking logic 505 increments the COUNT(EARLY) value in an internal counter (process step 715). If NO, then demodulation and time tracking logic 505 determines if the V(L) value is greater than or equal to the V(O) and V(E) values (process step 716). If YES, then the V(L) value and REG 17 are closer to the positive-going peak, indicating that the peak occurs later than REG16 and the V(O) value. In response, demodulation and time tracking logic 505 increments the COUNT(LATE) value in an internal counter (process step 717).

If demodulation and time tracking logic 505 determines that the V(L) value is not grater than or equal to the V(O) and V(E) values (process step 706), or after completion of process step 717, demodulation and time tracking logic 505 increments the COUNT(TOTAL) value in an internal counter (process step 721).

After each evaluation of Demod Bit(1), Demod Bit(O), and Demod Bit(−1) to detect 101 and 010 sequences, demodulation and time tracking logic 505 determines if COUNT(TOTAL) is equal to 64 (process step 722). If NO, then demodulation and time tracking logic 505 evaluates the next sequence of Demod Bit(1), Demod Bit(O), and Demod Bit(−1) values.

If COUNT(TOTAL) does equal 64, then demodulation and time tracking logic 505 determines if COUNT(EARLY) is greater than COUNT(ON TIME) and COUNT(LATE) (process step 723). If YES, then samples are being evaluated too early and demodulation and time tracking logic 505 generates a time tracking correction factor that delays sampling by ⅛ of a bit-width (i.e., 1 sample time period) (process step 725). Demodulation and time tracking logic 505 then resets the COUNT(TOTAL) value, the COUNT (EARLY) value, the COUNT(ON TIME) value, and the COUNT(LATE) value to zero (process step 727) and then evaluates the next sequence of Demod Bit(1), Demod Bit (O), and Demod Bit(−1) values.

If NO (i.e., COUNT(EARLY) is not greater than COUNT (ON TIME) and COUNT(LATE)), then demodulation and time tracking logic 505 determines if COUNT(LATE) is greater than COUNT(ON TIME) and COUNT(EARLY) (process step 724). If YES, then samples are being evaluated too late and demodulation and time tracking logic 505 generates a time tracking correction factor that advances sampling by ⅛ of a bit-width (i.e., 1 sample time period) (process step 726). Demodulation and time tracking logic 505 then resets the COUNT(TOTAL) value, the COUNT (EARLY) value, the COUNT(ON TIME) value, and the COUNT(LATE) value to zero (process step 727) and then evaluates the next sequence of Demod Bit(1), Demod Bit (O), and Demod Bit(−1) values.

If NO (i.e., COUNT(LATE) is not greater than COUNT (ON TIME) and COUNT(EARLY)), then COUNT(ON TIME) is greater than both COUNT(EARLY) and COUNT (LATE) and the samples are being evaluated at approximately the correct time. In response, demodulation and time tracking logic 505 resets the COUNT(TOTAL) value, the COUNT(EARLY) value, the COUNT(ON TIME) value, and the COUNT(LATE) value to zero (process step 727) and then evaluates the next sequence of Demod Bit(1), Demod Bit(O), and Demod Bit(−1) values.

Figure 8A:
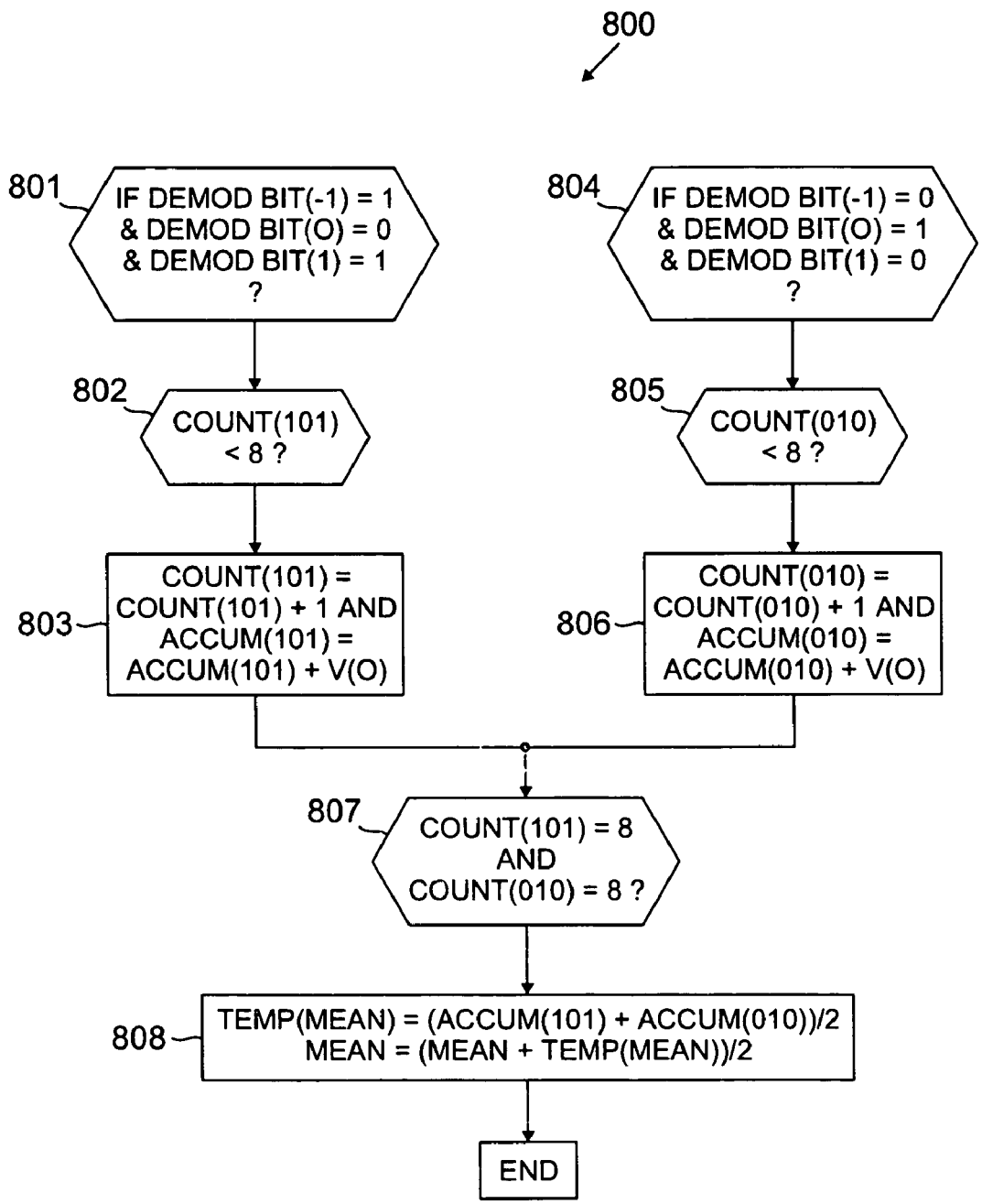
FIGS. 8A and 8B depict a flow diagram illustrating the frequency mean tracking operation performed by the demodulation and time tracking logic according to an exemplary embodiment of the present invention.
Figure 8B:
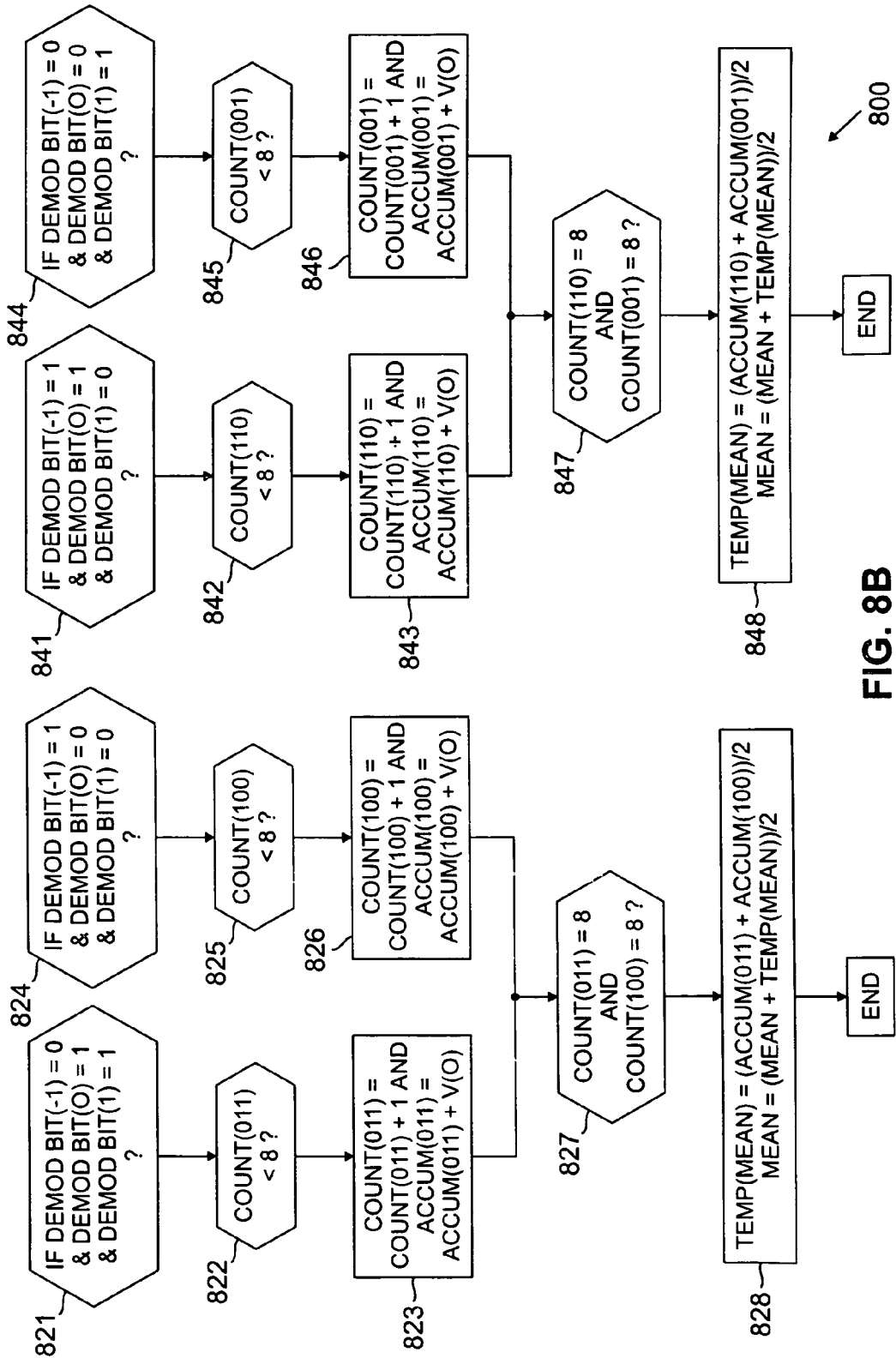

FIGS. 8A and 8B depict flow diagram 800, which illustrates the frequency mean tracking operation performed by demodulation and time tracking logic 505 according to an exemplary embodiment of the present invention. The algorithm executed by demodulation and time tracking logic 505 and illustrated in FIGS. 8A and 8B begins every 1 bit-time is initially synchronized to the estimate of the bit-time center given by signal acquisition block 460. Again, the auto-correlation has the property that it is symmetric and peaks at the optimum sampling time. By exploiting patterns in the data, demodulation and time tracking logic 505 in FSK receiver 400 can track out the frequency drift between the transmitter and receiver. In this case, demodulation and time tracking logic 505 averages the signal levels of the 010 and 101 sequences to produce an estimate of the transmitter and receiver frequency differences. This average value is then averaged with the previous (i.e., old) average to provide a new demodulation threshold.

Demodulation and time tracking logic 505 maintains internal counters of the number of 101 and 010 sequences that occur. In the exemplary embodiment, the frequency mean is updated after eight occurrences of a 010 sequence and eight occurrences of a 101 sequence. If a 101 sequence is detected (process step 801), demodulation and time tracking logic 505 determines if the COUNT(101) value in an internal counter is less than eight (process step 802). If YES, demodulation and time tracking logic 505 increments the COUNT(101) value and adds the current V(O) value to the ACCUM(101) value in an internal accumulator (process step 803).

Similarly, if a 010 sequence is detected (process step 804), demodulation and time tracking logic 505 determines if the COUNT(010) value in an internal counter is less than eight (process step 805). If YES, demodulation and time tracking logic 505 increments the COUNT(010) value and adds the current V(O) value to the ACCUM(010) value in an internal accumulator (process step 806).

After completion of process step 803 or process step 806, demodulation and time tracking logic 505 determines if the COUNT(101) value and the COUNT(010) value in the internal counters are equal to eight (process step 807). If YES, demodulation and time tracking logic 505 calculates a temporary frequency average value, TEMP(MEAN), by adding the ACCUM(101) value and the ACCUM(1) value and dividing by two. Demodulation and time tracking logic 505 also calculates a new frequency average, MEAN, by adding the old MEAN value to the TEMP(MEAN) value and dividing by two (process step 808).

FIG. 8B illustrates the frequency mean tracking operation performed by demodulation and time tracking logic 505, which also averages the signal levels of the 011, 100, 110, and 001 sequences to produce an estimate of the transmitter and receiver frequency differences. These operations are similar to process steps 801–808 described above. In process steps 821–828, demodulation and time tracking logic 505 updates the frequency average, MEAN, based on eight 011 sequences and eight 100 sequences. In process steps 841–848, demodulation and time tracking logic 505 updates the frequency average, MEAN, based on eight 110 sequences and eight 001 sequences.

It should be understood that the particular architecture of FSK receiver 400 illustrated in FIG. 4 above is by way of illustration only and should not be construed so as to limit that is scope of the present invention. In general, the present invention may be implemented with any demodulation and filtering architecture capable of receiving an incoming FSK signal, generating a baseband signal comprising a sequence of Logic 0 and Logic 1 bits and further capable of generating from the baseband signal an auto-correlation function having positive-going peaks coinciding with the center of the Logic 1 bit in a 010 sequence in the baseband signal and having negative-going peaks coinciding with the center of the Logic 0 bit in a 101 sequence in the baseband signal.

Furthermore, the particular architecture of digital demodulation logic block 455 is by way of illustration only and should not be construed so as to limit that scope of the present invention. For example, it is not required that each data bit in the baseband signal be sampled eight times per bit-width and that FIFO unit 520 contain 32 registers. In an alternate embodiment, each bit in the baseband signal may be sampled, for example, 4 times, 6 times, or 16 times per bit-width and FIFO unit 520 may contain 16 registers, 24 registers, or 64 registers.

Also, it is not require that the V(E) sample be the sample that immediately follows the V(O) sample or that the V(L) sample be the sample immediately preceding the V(O) sample. For example, in an alternate embodiment of the present invention, V(L) may be read from REG18 or REG19 in FIFO unit 520 and V(E) may be read from REG14 or REG13 in FIFO unit 520.

As explained above in greater detail, signal acquisition block 460 provides digital demodulation logic block 455 with a Signal Detected signal, an initial Time Offset signal, and an initial Frequency Offset signal. These signals are generated from a preamble that precedes the transmission of a block of data. The Signal Detected, Time Offset, and Frequency Offset signals indicate the presence of a carrier, identify the center of bit-time, and the frequency so that digital demodulation logic block 455 can accurately demodulate incoming data bits.

According to an exemplary embodiment of the present invention, signal acquisition block 460 is operable to receive a digital baseband signal comprising an amplitude modulated symbol stream of Logic 0 symbols and Logic 1 symbols, wherein each of the Logic 0 and Logic 1 symbols comprises S sequential samples, and wherein the amplitude modulated symbol stream contains a preamble of N known symbols preceding a plurality of user data symbols. Signal acquisition block 460 comprises: A) a signal mean determination circuit that receives G samples from the digital baseband signal and determines an amplitude mean value associated with the amplitude modulated symbol stream; and B) a correlation circuit that detects the preamble. According to the exemplary embodiment, the correlation circuit is capable of: 1) receiving substantially simultaneously a first sequential sample of S sequential samples associated with each of N consecutive symbols; and 2) generating a sum value equal to a total number of the N first sequential samples matching a corresponding one of the N known preamble symbols. The correlation circuit is capable of repeating steps 1) and 2) for the S-1 remaining sequential samples associated with each of the N consecutive symbols to thereby generate S sum values. The correlation circuit is further capable of determining a Kth sequential sample associated with a maximum one of the S sum values and generating a detection signal associated with the Kth sequential sample.

Figure 9:
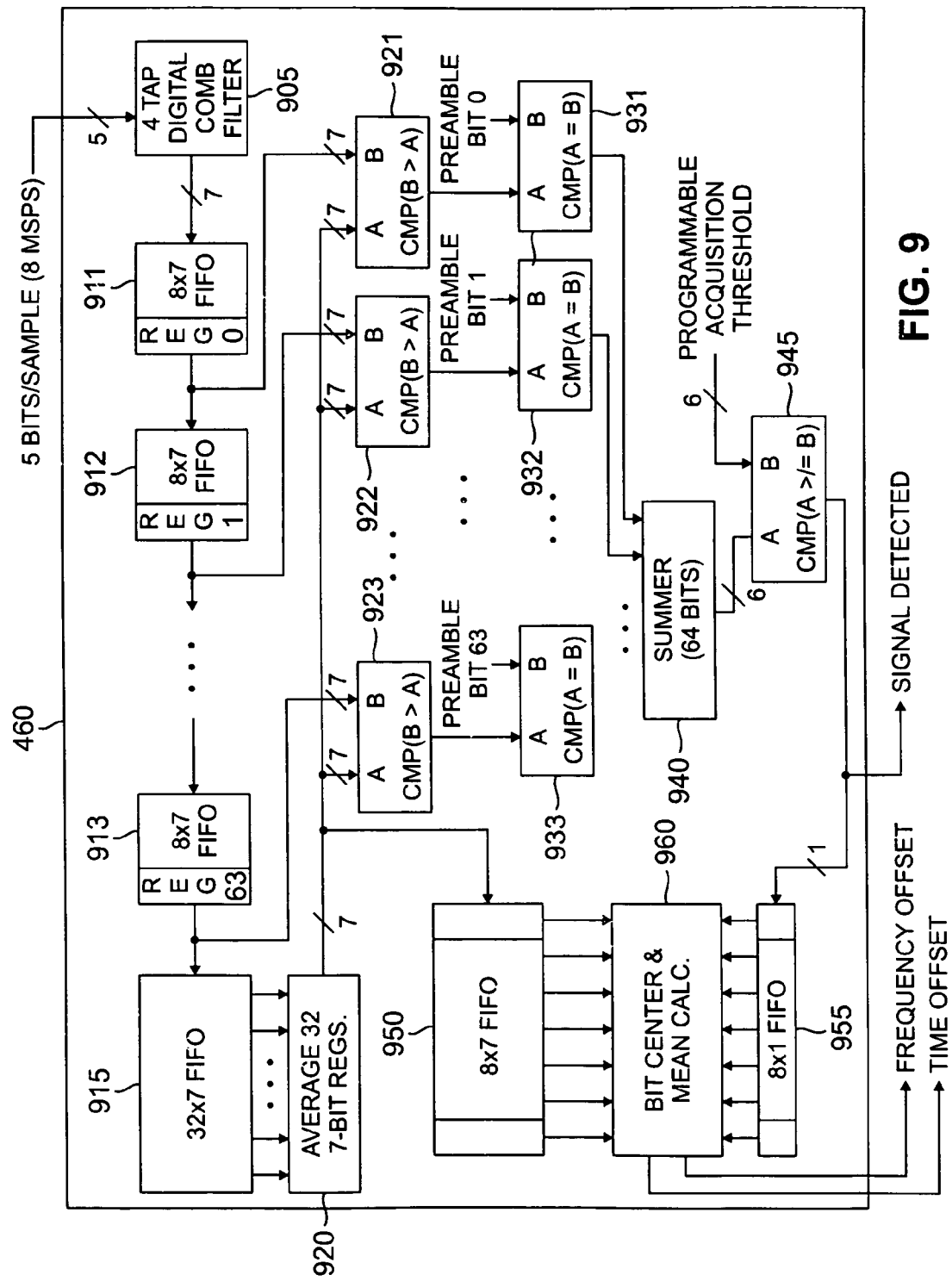
FIG. 9 illustrates the signal acquisition block in the exemplary frequency-shift-keyed (FSK) receiver in greater detail according to an exemplary embodiment of the present invention.

FIG. 9 illustrates signal acquisition block 460 in exemplary frequency-shift-keyed (FSK) receiver 400 in greater detail according to an exemplary embodiment of the present invention. Signal acquisition block 460 comprises 4-tap digital comb filter 905, sixty-four 8×7 first-in first-out (FIFO) units, including exemplary FIFO units 911, 912, and 913, and 32×7 FIFO unit 915. Each of the sixty-four 8×7 FIFO units contains eight 7-bit registers. FIFO unit 915 contains thirty-two 7-bit registers.

Signal acquisition block 460 also comprises a first row of sixty-four (64) comparators, including exemplary comparators 921, 922, and 923, a second row of sixty-four (64) comparators, including exemplary comparators 931, 932, and 933, 64-bit summer 940, and comparator 945. Finally, signal acquisition block 460 comprises frequency averaging unit 920, 8×7 FIFO unit 950, 8×1 FIFO unit 955, and bit center and mean calculation block 960. The sixty-four 8×7 FIFO units, the first and second rows of comparators, summer 940 and comparator 945 comprise a signal correlator that detects the presence of a known 64 symbol (or bit) preamble that is received by FSK receiver 400.

The stream of 5-bit binary samples from ADC 450 is sent at 8 Msps (mega-samples per second) to signal acquisition block 460. The 5-bit samples form an approximate digital representation of the auto-correlation function illustrated and described in FIG. 3. The 5-bit samples may have values ranging from +15 to −16, for example. Next, 4-tap digital comb filter 905 processes the 5-bit data samples from ADC 450 to remove quantization noise introduced by ADC 450 and to produce a better approximation to the auto-correlation function. Comb filter 510 increases the positive and negative peak sample values in the auto-correlation function relative to the samples having smaller magnitudes (i.e., near zero). The output of comb filter 510 are 7-bit values at an 8 MHz data rate. The 7-bit samples may have values ranging from +63 to −64, for example.

The 7-bit samples are then shifted through the sixty-four 8×7 FIFO units (from FIFO unit 911 through FIFO unit 913) before being shifted into 32×7 FIFO unit 915. The seven bits in the last register in each of the sixty-four 8×7 FIFO units are shifted into the first register in the next sequential 8×7 FIFO unit and also into one input channel (channel B) of one of the comparators in the first row of sixty-four (64) comparators, including exemplary comparators 921, 922, and 923. For example, the seven bits in REG0, the last register of FIFO unit 911, are shifted into the first register in FIFO unit 912 and into channel B of comparator 921. Similarly, the seven bits in REG1, the last register of FIFO unit 912, are shifted into the first register in the next sequential FIFO unit (not shown) and into channel B of comparator 922. Finally, the seven bits in REG63, the last register of the last (i.e., 64$^{th}$) 8×7 FIFO unit 913, are shifted into the first register in 32×7 FIFO unit 913 and into channel B of comparator 923. Thus, each 7-bit sample that leaves 4-tap digital comb filter 905 is sequentially shifted through every register in the sixty-four 8×7 FIFO units (from FIFO unit 911 through FIFO unit 913) and is shifted through every register in the 32×7 FIFO unit 915. Also, each 7-bit sample that leaves 4-tap digital comb filter 905 is sequentially applied to channel B of each comparator in the first row of sixty-four (64) comparators (from comparator 921 through comparator 923).

FSK receiver 400 receives an unmodulated carrier wave even when data is not being transmitted to FSK receiver 400. The frequency discriminator in FSK receiver 400 converts the unmodulated carrier wave to a DC voltage level corresponding to the center frequency value of the unmodulated carrier wave. The greater the center frequency, the large the DC voltage. For instance, a 1 MHz center frequency may correspond to a DC voltage of +5 volts. This DC voltage is converted to a sequence of 7-bit samples by ADC 450 and 4-tap digital comb filter 905. Eventually, these 7-bit samples fill all of the registers in the sixty-four 8×7 FIFO units (FIFO unit 911 to FIFO unit 913) and all 32 registers in FIFO unit 915. Thus, if the center frequency of the unmodulated carrier is converted to a nominal binary value of +10, for example, by the operation of frequency discriminator in FSK receiver 400, ADC 450, and 4-tap digital comb filter 905, then the sixty-four 8×7 FIFO units and 32×7 FIFO unit 915 are filled with 7-bit samples that are typically equal to +10, with some samples varying slightly (e.g., +9 or +11) due to signal noise or quantization errors.

The thirty-two 7-bit samples in FIFO unit 915 are applied to frequency averaging unit 920, which determines a frequency average (i.e., a mean value) that is applied to the channel A inputs of each comparator in the first row of sixty-four comparators (comparator 921 through comparator 923). Frequency averaging unit 920 essentially captures a moving window of 32 consecutive samples (equal to four symbols in width) and continually calculates the frequency mean value.

When data symbols are finally transmitted to FSK receiver 400, the data symbols are preceded by a preamble, or a known sequence of 64 symbols. In an advantageous embodiment of the present invention, the preamble is a pseudo-random sequence in which half (or approximately half) of the preamble symbols are Logic 0 values and the other half (or approximately half) of the preamble symbols are Logic 1 values. The preamble is said to be pseudo-random because the Logic 1 and Logic 0 symbols are mixed in a random fashion so as to resemble noise. The nature and properties of pseudo-random sequences are well-known to those skilled in the art and need not be explained in greater detail herein.

Each preamble symbol and data symbol is converted to eight 7-bit samples at an 8 MHz data rate, as explained above. When the sixty-four symbols are aligned in the first row of sixty-four comparators (comparator 921 to comparator 923), the eight 7-bit samples of the first preamble symbol are stored in the sixty-fourth 8×7 FIFO unit (i.e., FIFO unit 913), the eight 7-bit samples of the second preamble symbol are stored in the sixty-third 8×7 FIFO unit, the eight 7-bit samples of the third preamble symbol are stored in the sixty-second 8×7 FIFO unit, and so forth. The eight 7-bit samples of the sixty-fourth (i.e., last) preamble is symbol are stored in the first 8×7 FIFO unit (i.e., FIFO unit 911).

At the same time that the sixty-four symbols are aligned in the first row of sixty-four comparators, FIFO unit 915 is filled with the last 32 samples of the unmodulated carrier signal. Frequency averaging unit 920 uses these last 32 samples to calculate the frequency mean that is applied to the channel A input of the first row of sixty-four comparators. The output of each of the comparators in the first row of sixty-four comparators is Logic 1 if the 7-bit value on the channel B input (i.e., the output from the last register of one of the sixty-four 8×7 FIFO units) is larger than the 7-bit value on the channel A input (i.e., the frequency mean) and is Logic 0 if the 7-bit value on the channel B input is smaller than the 7-bit value on the channel A input.

The operation of signal acquisition block 460 in detecting the presence of the preamble can be explained by the following example. As noted above, it is assumed that the unmodulated carrier wave has a center frequency that corresponds to a value of +10, so that 32×7 FIFO unit 915 are filled with 7-bit samples that are typically equal to +10, with some samples varying slightly (e.g., +9 or +11) due to signal noise or quantization errors. A preamble symbol corresponding to a Logic 1 has a nominal value of +15 and a preamble symbol corresponding to a Logic 0 has a nominal value of +5. Thus, if the preamble is aligned in the sixty-four 8×7 FIFO units, each of the 8×7 FIFO units that holds a Logic 1 symbol would ideally contain eight 7-bit samples that are typically equal to +15, with some samples varying slightly (e.g., +14 or +16) due to signal noise or quantization errors, and each of the 8×7 FIFO units that holds a Logic 0 symbol would ideally contain eight 7-bit samples that are typically equal to +5, with some samples varying slightly (e.g., +4 or +6). However, due to intersymbol interference, the 7-bit samples of a 010 symbol sequence are more likely to resemble a positive-going peak and the 7-bit samples of a 101 symbol sequence are more likely to resemble a negative-going peak, as in the auto-correlation function shown in FIG. 3 above.

FIG. 10 illustrates in greater detail the 7-bit digital samples of four symbols according to an exemplary embodiment of the present invention. Symbols 1, 2, and 4 are Logic 0 values and each are represented by eight samples having binary values around +5. Symbol 3 is a Logic 1 value and is represented by eight samples labeled A–H. Samples A, B, C, D and E slope upward towards a binary value of +15. Samples F, G, and H slope back downward towards the original value around +5. Only samples D, E and F exceed the frequency mean value of +10. Thus, not all samples from the Logic 1 symbol (Symbol 3) have ideal values larger than the frequency mean value of +10. A similar phenomenon occurs in a 101 symbol sequence, so that not all samples from the Logic 0 symbol have ideal values smaller than the frequency mean value of +10.

Each comparator in the second row of 64 comparators (e.g., comparators 931, 932, etc.) compares one preamble symbol value with the output of one of the comparators from the first row of 64 comparators. In the ideal case, if the preamble is aligned in the sixty-four 8×7 FIFO units, each comparator in the first row of comparators outputs a Logic 1 level if it receives a sample from a Logic 1 symbol and outputs a Logic 0 level if it receives a sample from a Logic 0 symbol.

In the ideal case, this would be true for all eight samples from each symbol as those samples are shifted out through the last register (e.g., REG63) in each 8×7 FIFO unit. However, in the real world (i.e., non-ideal) case, this will not be true of all eight samples from each symbol. As is demonstrated in FIGS. 3 and 10, the preamble symbols and the user data symbols contain positive-going and negative-going peaks corresponding to 010 symbol sequences and 101 symbol sequences, respectively. Thus, as Symbol 1 and Symbol 2 in FIG. 10 are shifted through the last register of an 8×7 FIFO unit, a comparator in the first row of comparators that receives those samples from Symbols 1 and 2 outputs only Logic 0 levels, since all of the sample values (e.g., +5) from Symbols 1 and 2 are less than the frequency mean (e.g., +10) on channel A. However, as Symbol 3 in FIG. 10 is shifted through the last register of an 8×7 FIFO unit, a comparator in the first row of comparators that receives samples A–H from Symbol 3 outputs a Logic 1 level only for samples D, E, and F, since only samples D, E, and F have values (e.g., +12, +14, +13) greater than the frequency mean on channel A, and outputs a Logic 0 level for samples A, B, C, G, and H, since samples A, B, C, G, and H have values less than the frequency mean on channel A.

A similar occurrence occurs for a 101 symbol sequence, wherein a negative-going peak occurs and only the samples coinciding with the center of the Logic 0 symbol in the 101 sequence (i.e., center of the negative-going peak) have sample values less than the frequency mean value. Thus, a first row comparator receiving the eight samples from the Logic 0 symbol in the 101 symbol sequence outputs a correct Logic 0 level only for the samples near the center of the Logic 0 symbol and outputs an erroneous Logic 1 level for the remainder of the eight samples.

Thus, in a real world environment, even when the preamble is aligned in the sixty-four 8×7 FIFO units and the eight samples of each symbol are shifted out, some of the second row comparators receive the correct preamble symbol value from first row comparators only for some of the eight samples. Thus, some of the second row comparators output a Logic 1 to indicate a match (i.e., A=B) between the known preamble symbol value and the actual sample from a first row comparator for only some of the eight samples.

This may be explained in greater detail by considering Symbols 3 and 4 in FIG. 10. It is assumed that Symbols 3 and 4 correspond to the last two preamble symbols. Thus, Symbol 3 is Preamble Bit 1 (equal to Logic 1) and Symbol 4 is Preamble Bit 0 (equal to Logic 0). When the 64 symbols of the preamble are properly aligned in the sixty-four 8×7 FIFO units, the eight samples of Symbol 3 are in 8×7 FIFO unit 912 and the eight samples of Symbol 4 are in 8×7 FIFO unit 911. The eight samples of Symbol 4 are all approximately +5. As the eight samples of Symbol 4 are shifted through REG0 in FIFO unit 911, comparator 921 sequentially compares the eight samples on channel B to the frequency mean value (e.g., +10) and outputs eight sequential Logic 0 values (i.e., 00000000). Comparator 931 compares the output of comparator 921 to pre-defined PREAMBLE BIT 0 value (i.e., Logic 0) and detects equivalence (i.e., a match) for all eight outputs from comparator 921. Thus, Symbol 4 results in the output of comparator 931 being eight sequential Logic 1 values (i.e., 11111111). Similarly, Symbols 1 and 2 would cause similar (11111111) sequences at the outputs of corresponding second row comparators.

However, the results are different for Symbol 3. As the eight samples of Symbol 3 are shifted through REG1 in FIFO unit 912, comparator 922 sequentially compares samples A–H from Symbol 3 on channel B to the frequency mean value (e.g., +10) and outputs Logic 0 values for samples A, B, C, G, and H and outputs Logic 1 values for samples D, E, and F. Thus, the output of comparator 922 is the sequence (00011100). Comparator 932 compares the output of comparator 922 to pre-defined PREAMBLE BIT 1 value (i.e., Logic 1) and detects equivalence (i.e., a match) only for samples D, E, and F from comparator 921. Thus, the output of comparator 932 is the sequence (00011100).

The end result is that as Symbols 3 and 4 are shifted out of REG1 and REG0, respectively, the two outputs of comparators 932 and 931 comprise the sequence (01, 01, 01, 11, 11, 11, 01, 01). Including Symbols 1 and 2 would give the sequence (1101, 1101, 1101, 1111, 1111, 1111, 1101, 1101). A pattern similar to this will be repeated at the center each positive-going peak and negative-going peak in the autocorrelation function. All 64 outputs of the second row of sixty-four comparators are added together by 64-bit summer 940. The sum at the output of summer 940 will achieve a peak value close to 64 that will coincide with centers of the positive-going peaks and negative-going peaks in the autocorrelation function caused by 010 and 101 symbol sequences in the preamble.

Because of the pseudo-random properties of the preamble, if the preamble is not aligned in the sixty-four 8×7 registers, then the 7-bit values applied to the channel B inputs of the first row of sixty-four comparators are randomly distributed above or below the frequency mean value. Thus, the first row comparators output a Logic 1 for approximately half of the samples and output a Logic 0 for approximately half of the samples. However, since the preamble is misaligned, the outputs of the first row comparators are only randomly compared to the pre-defined preamble bit values (i.e., PREAMBLE BIT 63 through PREAMBLE BIT 0) by the second row comparators. This being the case, the 64 outputs of the 64 second row comparators are randomly distributed Logic 1 and Logic 0 values. This means that, on average, about half of the outputs of the second row comparators are Logic 1 and about half of the outputs of the second row comparators are Logic 0 when the preamble is not properly aligned in the sixty-four 8×7 FIFO units. These outputs are added by summer 940 to give a average output of approximately 32, when the preamble is not properly aligned. In actual operation, the output of value summer 940 will vary between, for example, 25 and 40, according to some random variance, when the preamble is not properly aligned.

However, when the preamble is properly aligned, the 64 outputs of the first row comparators are no longer randomly compared to the pre-defined preamble bit values (i.e., PREAMBLE BIT 63 through PREAMBLE BIT 0) by the second row comparators. Instead, there is a correlation between the outputs of the first row comparators and the pre-defined preamble bit values. This being the case, the 64 outputs of the 64 second row comparators are mostly Logic 1 values due to the correlation. This causes the output of summer 940 to jump to a much higher value. The point of maximum correlation (i.e., highest peak value) occurs at the samples from the centers of the positive-going peaks and negative-going peaks in the auto-correlation function (e.g., samples D, E, and F in FIG. 10) caused by the 010 and 101 sequences in the preamble.

Thus, when the preamble is properly aligned in the sixty-four 8×7 FIFO units, the shifting out of the eight samples of each symbol causes a large peak in the output of summer 940 that coincides with the centers of the positive-going peaks and negative-going peaks in the auto-correlation function. By way of example, when the properly-aligned preamble is shifted out of the sixty-four 8×7 FIFO units, the output of summer 940 jumps from an average of 32 to, for example, the eight sequential values 49, 52, 55, 60, 63, 61, 54, 51.

It is noted that, in the example, the maximum values 60, 63, and 61 are aligned with the centers of the positive-going peaks and negative-going peaks in the auto-correlation function (e.g., samples D, E, and F in FIG. 10) caused by the 010 and 101 sequences in the preamble. In order to detect the center of the peak in the output of summer 940, comparator 945 compares the output of summer 940 to a programmable acquisition threshold value to determine if the output of summer 940 is greater than or equal to the programmable acquisition threshold value. For example, if the programmable acquisition threshold value is set to a value of 57, and the output of summer 940 is the sequence (49, 52, 55, 60, 63, 61, 54, 51) when the properly-aligned preamble is shifted out of the sixty-four 8×7 FIFO units, then the SIGNAL DETECTED signal at the output of comparator 945 is the sequence (0, 0, 0, 1, 1, 1, 0, 0).

Depending on the value of the programmable acquisition threshold and the signal-to-noise ratio of the preamble symbols, the number of Logic 1 values in the SIGNAL DETECTED signal may vary. For example, if the signal-to-noise ratio of the preamble symbols is very high and the programmable acquisition threshold is relatively low (e.g., 45), the SIGNAL DETECTED signal may be the sequence (1, 1, 1, 1, 1, 1, 1, 1). If the signal-to-noise ratio of the preamble symbols is not high or the programmable acquisition threshold is slightly increased (e.g., 50), or both, the SIGNAL DETECTED signal may be the sequence (0, 1, 1, 1, 1, 1, 0, 0). If the signal-to-noise ratio of the preamble symbols is relatively low or the programmable acquisition threshold is relatively high (e.g., 60), or both, the SIGNAL DETECTED signal may be the sequence (0, 0, 0, 0, 1, 0, 0, 0).

The eight bits of the SIGNAL DETECTED signal are shifted into 8×1 FIFO unit 960. Similarly, eight 7-bit frequency mean values output by frequency averaging unit 920 are shifted into 8×7 FIFO unit 950 as the SIGNAL DETECTED signal is shifted into 8×1 FIFO unit 960. Bit center and mean calculation block 960 reads the eight bits in FIFO unit 960 in parallel and identifies the location of the center of the preamble bit (or symbol). For example, if the SIGNAL DETECTED signal is the sequence (0, 0, 0, 1, 1, 1, 0, 0), bit center and mean calculation block 960 may determine that the second Logic 1 value (fifth value in sequence) is the center of the preamble bit. If the SIGNAL DETECTED signal is the sequence (0, 1, 1, 1, 1, 0, 0, 0), bit center and mean calculation block 960 may determine that the second Logic 1 value (third value in sequence) is the center of the preamble bit.

Once the center of the preamble bit is identified, bit center and mean calculation block 960 outputs a TIME OFFSET signal and a FREQUENCY OFFSET signal that are used by digital demodulation logic block 455. The TIME OFFSET signal is used by digital demodulation logic block 455 as an initial estimate of the center of the data symbols following the preamble in order to perform demodulation, as explained above in FIGS. 5–8. The FREQUENCY OFFSET signal is used by digital demodulation logic block 455 as an initial estimate of the frequency mean (i.e., signal mean) as part of the demodulation process, as explained above in FIGS. 5–8.

The TIME OFFSET signal and the FREQUENCY OFFSET signal generated by signal acquisition block 460 are only used immediately after detection of the preamble symbols, when the SIGNAL DETECTED signal is exerted. As explained above in FIGS. 5–8, once the initial values of the TIME OFFSET signal and a FREQUENCY OFFSET signal are generated, digital demodulation logic block 455 adjusts time tracking and frequency mean values by itself according to the centers of the positive-going peaks and negative-going peaks in the auto-correlation function of the data symbols (bits) demodulated by digital demodulation logic block 455. The TIME OFFSET signal and the FREQUENCY OFFSET signal are not reloaded into digital demodulation logic block 455 until the SIGNAL DETECTED signal is exerted again (i.e., when the next preamble is detected).

Although the present invention has been described in detail, those skilled in the art should understand that they can make various changes, substitutions and alterations herein without departing from the spirit and scope of the invention in its broadest form.

What is claimed is:

1. A signal detection circuit capable of receiving a digital baseband signal comprising an amplitude modulated symbol stream of Logic 0 symbols and Logic 1 symbols, each of said Logic 0 and Logic 1 symbols comprising a plurality of sequential samples, said amplitude modulated symbol stream containing a preamble having a plurality of known symbols preceding a plurality of user data symbols, said signal detection circuit comprising:

a signal mean determination circuit operable to receive at least some of the samples from said digital baseband signal and to determine therefrom an amplitude mean value associated with said amplitude modulated symbol stream; and a correlation circuit operable to detect said preamble, said correlation circuit capable of:

1) receiving substantially simultaneously a first sequential sample for each of a plurality of consecutive symbols;

2) generating a sum value equal to a total number of said first sequential samples that match corresponding ones of said known preamble symbols;

3) repeating steps 1) and 2) for remaining sequential samples associated with each of the consecutive symbols to thereby generate a plurality of sum values; and
4) determining the sequential sample associated with a maximum one of said sum values and generating a detection signal associated with said sequential sample associated with the maximum sum value.

2. The signal detection circuit as set forth in claim 1 wherein said correlation circuit comprises a FIFO assembly comprising a plurality of serially-coupled FIFO units, each of said FIFO units capable of storing the plurality of sequential samples associated with one of said consecutive symbols.

3. The signal detection circuit as set forth in claim 2 wherein said correlation circuit further comprises a first group of comparators operable to compare substantially simultaneously said first sequential samples retrieved from said FIFO units to said amplitude mean value and, in response to said comparison, to generate a plurality of decided values, each of said decided values equal to a Logic 1 value if a corresponding first sequential sample is greater than said amplitude mean value and equal to a Logic 0 value if said corresponding first sequential sample is less than said amplitude mean value.

4. The signal detection circuit as set forth in claim 3 wherein said correlation circuit further comprises a second group of comparators operable to compare substantially simultaneously each of said decided values to said corresponding one of said known preamble symbols, and, in response to said comparison, to generate a match value equal to Logic 1 for each of said decided values that equals said corresponding known preamble symbol and to generate a match value equal to Logic 0 for each of said decided values that does not equal said corresponding known preamble symbol.

5. The signal detection circuit as set forth in claim 4 wherein said correlation circuit further comprises a summer operable to add said match values to thereby generate said sum value.

6. The signal detection circuit as set forth in claim 5 wherein said correlation circuit further comprises peak detection circuitry capable of determining if said sum value exceeds a predetermined threshold and generating said detection signal if said sum value exceeds said predetermined threshold.

7. The signal detection circuit as set forth in claim 1 wherein said signal mean determination circuit determines said amplitude mean value from the sequential samples immediately preceding said known preamble symbols.

8. The signal detection circuit as set forth in claim 1 wherein said signal detection circuit is associated with a demodulation circuit capable of demodulating said plurality of user data symbols following said known preamble symbols, wherein said signal detection circuit transmits said amplitude mean value to said demodulation circuit in response to generation of said detection signal.

9. The signal detection circuit as set forth in claim 8 wherein said signal detection circuit, in response to generation of said detection signal, transmits to said demodulation circuit a time offset value associated with said sequential sample associated with the maximum sum value.

10. A frequency-shift-keyed (FSK) receiver comprising:
demodulation circuitry capable of receiving an incoming FSK signal and generating therefrom a baseband signal comprising an amplitude modulated symbol stream of Logic 0 symbols and Logic 1 symbols, said amplitude modulated symbol stream containing a preamble having a plurality of known symbols preceding a plurality of user data symbols;
auto-correlation circuitry capable of sampling said baseband signal a plurality of times during each symbol and generating an auto-correlation function comprising a sample stream of samples and having a positive-going peak approximately coinciding with a center of the Logic 1 symbol in a 010 sequence in said baseband signal and a negative-going peak approximately coinciding with a center of the Logic 0 symbol in a 101 sequence in said baseband signal; and
a signal detection circuit capable of receiving said sample stream and comprising:
a signal mean determination circuit operable to receive at least some of the samples from said sample stream and to determine therefrom an amplitude mean value associated with said amplitude modulated symbol stream; and
a correlation circuit operable to detect said preamble, said correlation circuit capable of:
1) receiving substantially simultaneously a first sequential sample for each of a plurality of consecutive symbols;
2) generating a sum value equal to a total number of said first sequential samples that match corresponding ones of said known preamble symbols;
3) repeating steps 1) and 2) for remaining sequential samples associated with each of the consecutive symbols to thereby generate a plurality of sum values; and
4) determining the sequential sample associated with a maximum one of said sum values and generating a detection signal associated with said sequential sample associated with the maximum sum value.

11. The FSK receiver as set forth in claim 10 wherein said correlation circuit comprises a FIFO assembly comprising a plurality of serially-coupled FIFO units, each of said FIFO units capable of storing the plurality of sequential samples associated with one of said consecutive symbols.

12. The FSK receiver as set forth in claim 11 wherein said correlation circuit further comprises a first group of comparators operable to compare substantially simultaneously said first sequential samples retrieved from said FIFO units to said amplitude mean value and, in response to said comparison, to generate a plurality of decided values, each of said decided values equal to a Logic 1 value if a corresponding first sequential sample is greater than said amplitude mean value and equal to a Logic 0 value if said corresponding first sequential sample is less than said amplitude mean value.

13. The FSK receiver as set forth in claim 12 wherein said correlation circuit further comprises a second group of comparators operable to compare substantially simultaneously each of said decided values to said corresponding one of said known preamble symbols, and, in response to said comparison, to generate a match value equal to Logic 1 for each of said decided values that equals said corresponding known preamble symbol and to generate a match value equal to Logic 0 for each of said decided values that does not equal said corresponding known preamble symbol.

14. The FSK receiver as set forth in claim 13 wherein said correlation circuit further comprises a summer operable to add said match values to thereby generate said sum value.

15. The FSK receiver as set forth in claim 14 wherein said correlation circuit further comprises peak detection circuitry capable of determining if said sum value exceeds a predetermined threshold and generating said detection signal if said sum value exceeds said predetermined threshold.

16. The FSK receiver as set forth in claim 10 wherein said signal mean determination circuit determines said amplitude mean value from the sequential samples immediately preceding said known preamble symbols.

17. The FSK receiver as set forth in claim 10 wherein said signal detection circuit transmits said amplitude mean value to said demodulation circuitry in response to generation of said detection signal.

18. The FSK receiver as set forth in claim 17 wherein said signal detection circuit, in response to generation of said detection signal, transmits to said demodulation circuitry a time offset value associated with said sequential sample associated with the maximum sum value.

19. A method of processing a received frequency-shift-keyed (FSK) signal comprising the steps of:
 1) generating from the FSK signal a baseband signal comprising an amplitude modulated symbol stream of Logic 0 symbols and Logic 1 symbols, the amplitude modulated symbol stream containing a preamble having a plurality of known symbols preceding a plurality of user data symbols;
 2) sampling the baseband signal a plurality of times during each symbol and generating an auto-correlation function comprising a sample stream of samples and having a positive-going peak approximately coinciding with a center of the Logic 1 symbol in a 010 sequence in the baseband signal and a negative-going peak approximately coinciding with a center of the Logic 0 symbol in a 101 sequence in the baseband signal;
 3) receiving substantially simultaneously a first sequential sample for each of a plurality of consecutive symbols;
 4) generating a sum value equal to a total number of the first sequential samples that match corresponding ones of the known preamble symbols;
 5) repeating steps 3) and 4) for remaining sequential samples associated with each of the consecutive symbols to thereby generate a plurality of sum values;
 6) determining the sequential sample associated with a maximum one of the sum values; and
 7) generating a detection signal associated with the sequential sample associated with the maximum sum value.

20. The method as set forth in claim 19 further comprising the step of determining from at least some of the samples of the baseband signal an amplitude mean value associated with the amplitude modulated symbol stream.

* * * * *